United States Patent
Yoon et al.

(10) Patent No.: US 11,517,137 B2
(45) Date of Patent: Dec. 6, 2022

(54) COFFEE VENDING MACHINE

(71) Applicant: HAESUNG ENGINEERING CO., LTD., Paju-si (KR)

(72) Inventors: Jum Chae Yoon, Seoul (KR); Sang Hoon Lee, Seoul (KR); Byung Mun Ahn, Goyang-si (KR)

(73) Assignee: HAESUNG ENGINEERING CO., LTD., Paju-si (KR)

( * ) Notice: Subject to any disclaimer, the term of this patent is extended or adjusted under 35 U.S.C. 154(b) by 464 days.

(21) Appl. No.: 16/631,301

(22) PCT Filed: Jun. 19, 2018

(86) PCT No.: PCT/KR2018/006922
§ 371 (c)(1),
(2) Date: Jan. 15, 2020

(87) PCT Pub. No.: WO2019/022384
PCT Pub. Date: Jan. 31, 2019

(65) Prior Publication Data
US 2020/0205601 A1 Jul. 2, 2020

(30) Foreign Application Priority Data
Jul. 24, 2017 (KR) .................. 10-2017-0093460

(51) Int. Cl.
*A47J 31/36* (2006.01)
*A47J 31/52* (2006.01)
*A47J 31/44* (2006.01)
*G07F 7/08* (2006.01)
*G07F 13/06* (2006.01)
*G07F 13/10* (2006.01)

(52) U.S. Cl.
CPC ....... *A47J 31/3633* (2013.01); *A47J 31/3638* (2013.01); *A47J 31/4403* (2013.01);
(Continued)

(58) Field of Classification Search
CPC .... A47J 31/3633; A47J 31/52; A47J 31/3638; A47J 31/4403; G07F 13/10; G07F 7/08; G07F 13/065
See application file for complete search history.

(56) References Cited

U.S. PATENT DOCUMENTS

2003/0145736 A1* 8/2003 Green ................. A47J 31/3642
99/289 R
2005/0038559 A1* 2/2005 Ghidotti ................ G07F 13/065
221/96
(Continued)

FOREIGN PATENT DOCUMENTS

JP          08263744        10/1996
KR       20040021918        3/2004
(Continued)

OTHER PUBLICATIONS

International Search Report—PCT/KR2018/006922 dated Sep. 28, 2018.

*Primary Examiner* — Michael Collins
(74) *Attorney, Agent, or Firm* — Cantor Colburn LLP

(57) ABSTRACT

Provided is a coffee vending machine including: a plurality of capsule stacking parts arranged in a lattice form to stack capsules therein in a first direction, a capsule feeding unit disposed at the centers of the bottoms of the capsule stacking parts to feed the capsules quantitatively, a coffee brewing part for seating the capsule fed from the capsule feeding unit, feeding water to the capsule, and brewing coffee to be provided for a consumer, and a cup discharging part for discharging a cup in which the coffee is contained to the outside. The coffee brewing part allows the capsule to be seated onto a seating groove when first and second portion seating parts are adjacent thereto or contacted with each other and allows the capsule to be freely fallen through a
(Continued)

space formed between the first and second portion seating parts when they are spaced apart from each other.

12 Claims, 19 Drawing Sheets

(52) U.S. Cl.
CPC ............... *A47J 31/52* (2013.01); *G07F 7/08* (2013.01); *G07F 13/065* (2013.01); *G07F 13/10* (2013.01)

(56) References Cited

U.S. PATENT DOCUMENTS

| | | | |
|---|---|---|---|
| 2006/0124659 A1* | 6/2006 | Mosconi | A47J 31/3623 221/161 |
| 2008/0277409 A1* | 11/2008 | Magno | G07F 11/24 221/119 |
| 2009/0250482 A1* | 10/2009 | Blanchino | A47J 31/3642 221/9 |
| 2012/0048121 A1* | 3/2012 | Krug | A47J 31/3633 99/290 |
| 2013/0186908 A1* | 7/2013 | Magno | A47J 31/3642 221/13 |
| 2018/0110358 A1* | 4/2018 | Piras | A47J 31/3638 |

FOREIGN PATENT DOCUMENTS

| | | |
|---|---|---|
| KR | 20160015430 | 2/2016 |
| KR | 20160148772 | 12/2016 |
| KR | 20170072307 | 6/2017 |

* cited by examiner

COFFEE VENDING MACHINE

CROSS-REFERENCE TO RELATED APPLICATIONS

This application is a national entry of PCT Application No. PCT/KR2018/006922 filed on Jun. 19, 2018, which claims priority to and the benefit of Korean Application No. 10-2017-0093460 filed Jul. 24, 2017, in the Korean Patent Office, the entire contents of which are incorporated herein by reference.

TECHNICAL FIELD

The present invention relates to a coffee vending machine that is capable of feeding water or steam to a capsule in which a material for coffee is contained to directly vend the coffee to a consumer.

BACKGROUND ART

A vending machine is a device for automatically selling goods, without a salesman, and if a coin, bill, or card is inserted into the vending machine to select a desired item or if payment for a desired item is finished through a mobile phone, the item is discharged from the vending machine. The vending machine is simply called an automated machine. The vending machines have been found in many countries, and according to investigation of Japanese vending machine industry association, the number of vending machines is 5,094,000 on 2013, which is substantially large. As various kinds of goods are sold through vending machines, further, the vending machines become more popularly introduced and used.

Generally, a variety of capsules for storing a powder, liquid or viscous material for long hours have been suggested. For example, as shown in FIG. 26, a coffee capsule plate CP (hereinafter, referred to as "capsule") is suggested in Korean Patent Application Laid-Open No. 10-2004-0021918, which will be explained below.

The conventional coffee capsule plate CP has storage holes BW for storing coffee powder (not shown) and cutting grooves CH formed around the storage holes BW on a top surface of a sheet SH located on top thereof and an underside thereof. The cutting grooves CH serve to easily cut the capsules having the coffee powder stored in the storage holes BW to sets having appropriate numbers and also to easily open the capsules separated from the sets.

However, the capsule has to be one by one sold in a state where a salesman is standing by, which causes waste of labor forces. Besides, the capsule is drawn, and water is poured into the capsule to make coffee, which is inefficient in making the coffee and also requires a lot of time.

If beverages are sold through a vending machine, on the other hand, a consumer can drink the beverages contained in plastic, aluminum can, glass, and so on or the beverages contained in cups where a powder or liquid material is mixed with water.

As coffee as a kind of beverage has been recently very popular, various coffee vending machines have been developed and introduced. Further, consumers desire to have their brand coffee according to their preference. Under such a coffee trend atmosphere, accordingly, a coffee vending machine or a supplier for making or supplying the coffee vending machines have to satisfy the consumer's desire to drink his or her brand coffee.

DISCLOSURE

Technical Problem

Accordingly, the present invention has been made to solve the above-mentioned problems, and it is an object of the present invention to provide a coffee vending machine that is capable of feeding water or steam to a capsule in which a liquid, viscous, or powder coffee material is contained to directly make and vend a consumer's brand coffee at a site, without any waste of a labor force.

It is another object of the present invention to provide a coffee vending machine that is capable of improving conveniences of a consumer and being managed through wireless communication.

It is yet another object of the present invention to provide a method for operating a coffee vending machine using a capsule in which a coffee material is contained.

It is still another object of the present invention to provide a method for managing a coffee vending machine using a capsule in which a coffee material is contained.

Technical Solution

To accomplish the above-mentioned objects, according to one aspect of the present invention, there is provided a coffee vending machine including: a plurality of capsule stacking parts arranged in a lattice form to stack a plurality of capsules therein in a first direction; a capsule feeding unit disposed at the centers of the bottoms of the capsule stacking parts to feed the capsules quantitatively; a water feeding part for feeding water to the capsule fed from the capsule feeding unit to allow a coffee material contained in the capsule to be diluted; and a cup feeding part for feeding a cup in which coffee made through the dilution of the water feeding part is contained to discharge the cup to the outside.

To accomplish the above-mentioned objects, according to another aspect of the present invention, there is provided a coffee vending machine using capsules containing a coffee material for drip coffee, including: a plurality of capsule stacking parts for accommodating the capsules stacked in a vertical direction; a capsule feeding unit disposed at the bottoms of the capsule stacking parts to allow the capsules to selectively fall from the capsule stacking parts; a capsule transport part for transporting the capsule fallen to a channel by means of the capsule feeding unit; a cup stacking part disposed in parallel to the capsule stacking parts; a cup feeding part located under the cup stacking part to allow the cup from the cup stacking part to be selectively fallen to the inner side from an end portion of the capsule transport part, an alignment part for aligning the cup and the capsule, a coffee brewing part for injecting water or steam into the capsule seated by the capsule transport part and aligned by the alignment part to brew coffee; and a cup discharging part for moving the cup in which the coffee brewed by the coffee brewing part is contained to a given position.

To accomplish the above-mentioned objects, according to yet another aspect of the present invention, there is provided a coffee vending machine including: a plurality of capsule stacking parts arranged in a lattice form to stack a plurality of capsules therein in a first direction; a capsule feeding unit disposed at the centers of the bottoms of the capsule stacking parts to feed the capsules quantitatively; a coffee brewing part for injecting water or steam into the capsule fed and seated from the capsule feeding unit to brew coffee to be provided for a consumer; and a cup discharging part for discharging a cup in which the coffee is contained to the outside.

To accomplish the above-mentioned objects, according to still another aspect of the present invention, there is provided a coffee vending machine including: a plurality of capsule stacking parts arranged in a lattice form to stack a plurality of capsules therein in a first direction; a capsule feeding unit disposed at the centers of the bottoms of the capsule stacking parts to feed the capsules quantitatively; a coffee brewing part for seating the capsule fed from the capsule feeding unit, feeding water to the capsule, and brewing coffee to be provided for a consumer; and a cup discharging part for discharging a cup in which the coffee is contained to the outside, wherein the coffee brewing part includes a first portion seating part and a second portion seating part, the first portion seating part having a first semicircular concave portion formed on the side surface facing the second portion seating part in such a manner as to be extended toward the upper side thereof and the second portion seating part having a second semicircular concave portion formed on the side surface facing the first portion seating part in such a manner as to be extended toward the upper side thereof, so that if the first portion seating part and the second portion seating part are adjacent thereto or contacted with each other, the first concave portion and the second concave portion form a seating groove, and the capsule selectively fallen and transported from the capsule feeding unit is seated onto the seating groove and then freely falls through a space between the first portion seating part and the second portion seating part when the first portion seating part and the second portion seating part are spaced apart from each other.

Advantageous Effects

According to the present invention, the coffee vending machine can feed the water or steam to the capsule in which a liquid, viscous, or powder coffee material is contained, directly make a consumer's brand coffee, and to vend the coffee to the consumer efficiently at a site, without any waste of a labor force, so that he or she can enjoy the brand coffee according to his or her preference.

In addition, the coffee vending machine according to the present invention can optimize the configurations and arrangements of the capsule stacking parts, the capsule transport part, the coffee brewing part, the cup feeding part, and the ice feeding part and minimize the installation area thereof by means of the capsule stacking parts disposed in the lattice form.

Further, the coffee vending machine according to the present invention includes the card payment unit and the mobile payment unit and is managed through wireless communication, thereby in real time handling works such as failure detection, sales quantity calculation, and capsule stock calculation rapidly and reliably.

MODE FOR INVENTION

Figure 1:
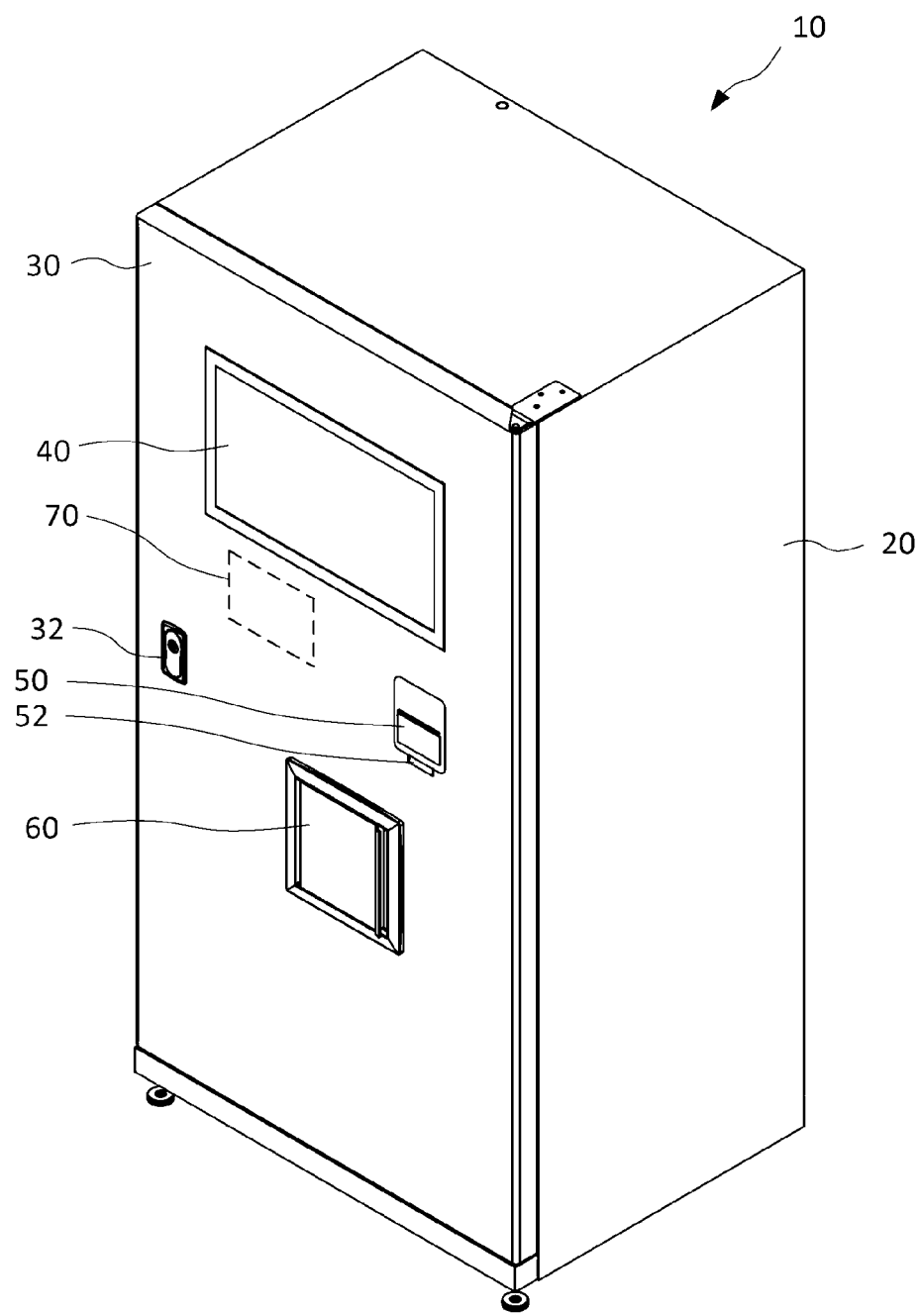
FIG. 1 is a perspective view showing a coffee vending machine according to one embodiment of the present invention.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention. In the description, it should be noted that the parts corresponding to those of the drawings are indicated by corresponding reference numerals.

Hereinafter, the present invention will now be described in detail with reference to the attached drawings.

Figure 2:
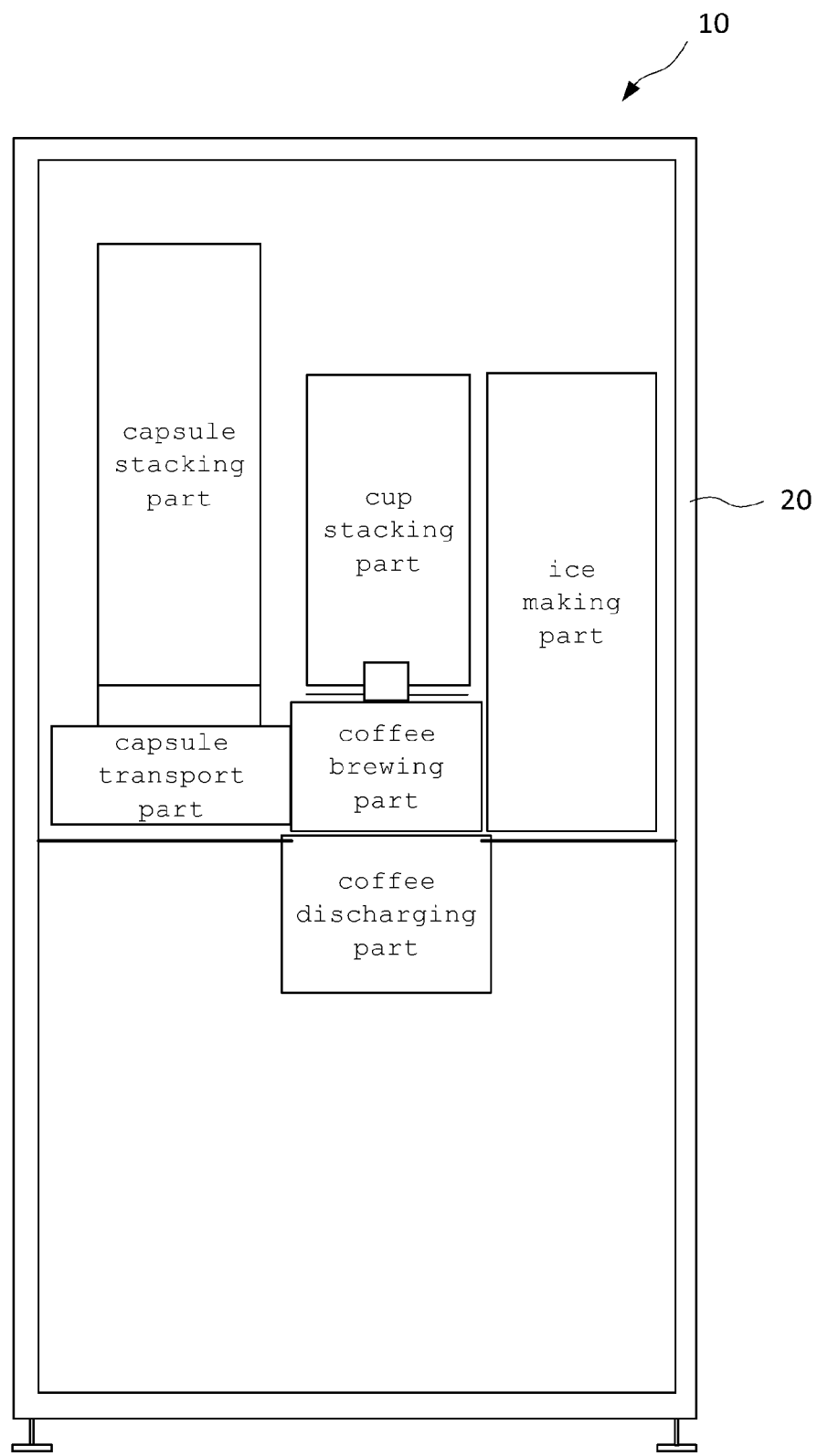
FIG. 2 is a front block diagram showing arrangements of main parts of the coffee vending machine of FIG. 1.

FIG. 1 is a perspective view showing a coffee vending machine according to one embodiment of the present invention. FIG. 2 is a front block diagram showing arrangements of main parts of the coffee vending machine of FIG. 1. FIG.

Figure 4:
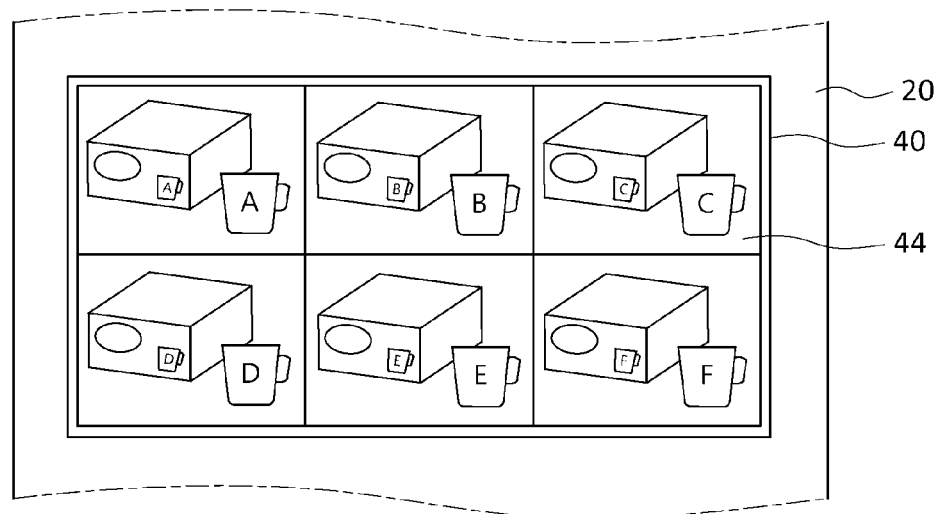
FIG. 4 is an exemplary view showing a screen for a main operating process of a touch panel of the coffee vending machine of FIG. 1.

3 is a plan block diagram showing arrangements of main parts of the coffee vending machine of FIG. 1. FIG. 4 is an exemplary view showing a screen for a main operating process of a touch panel of the coffee vending machine of FIG. 1.

Referring to FIG. 1, a coffee vending machine 10 according to the present invention is a device that is capable of rapidly making hot or cold coffee with a variety of kinds of capsules in which different coffee materials are contained to provide a consumer's desired brand coffee for the consumer on every place where the coffee vending machine is built. To this end, the coffee vending machine 10 according to the present invention includes a body 20, a front panel 30, a touch panel 40, a mobile payment unit 50, a card payment unit 52, a cup discharging part 60, and a control device 70.

The body 20 and the front panel 30 are made of metal, plastic, or a combination material thereof and have a shape of a generally rectangular box.

The touch panel 40 adopts capacitive touch, especially, projected capacitive touch (PCT), but it is not limited thereto. The touch panel 40 may make use of surface capacitive touch (SCT), resistive touch, surface acoustic wave (SAW), infrared (IR) touch, optical touch, and so on.

The mobile payment unit 50 and the card payment unit 52 make use of payment modules currently used or to be commercialized in the future. Further, they are connected to the control device 70 and controlled through the control device 70.

Figure 3:
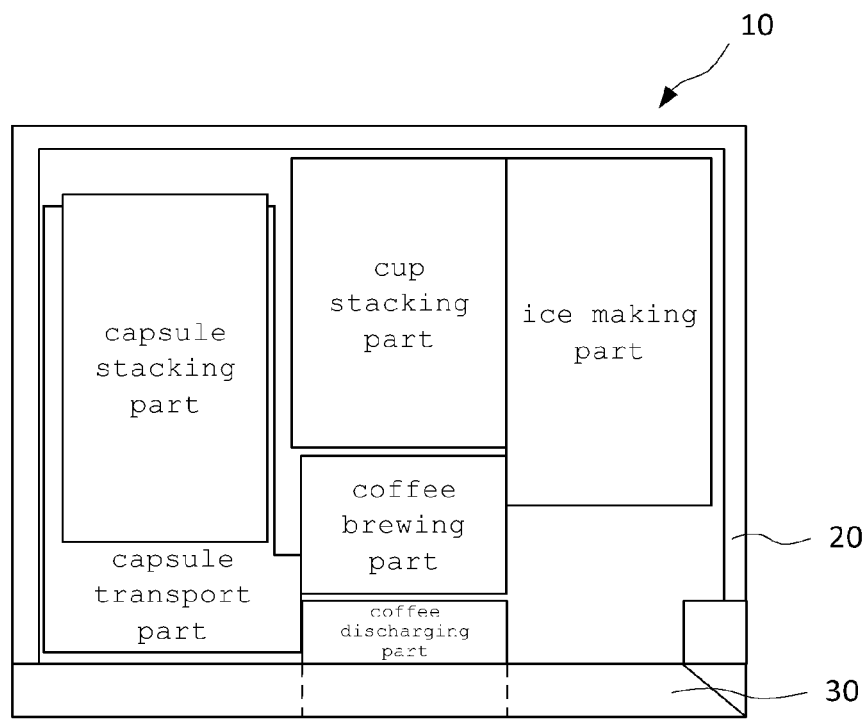
FIG. 3 is a plan block diagram showing arrangements of main parts of the coffee vending machine of FIG. 1.

Also, as shown in FIGS. 2 and 3, the coffee vending machine 10 includes capsule stacking parts, a capsule feeding part (shortly, transport part), a capsule alignment part (shortly, alignment part), a cup feeding part (inclusive of cup stacking parts), a water feeding part, a coffee brewing part, an ice feeding part, a coffee discharging part, and a speaker, which are mounted inside the body 20. According to the present invention, the coffee vending machine 10 is capable of optimizing the configurations and arrangements of the capsule stacking parts, the transport part, the cup feeding part, and the coffee brewing part so as to minimize areas occupied by them.

The coffee vending machine 10 is a vending machine for selling coffee, which is briefly called 'vending machine'. The capsule stacking parts are called 'capsule stacking containers', and in a wide meaning, the capsule feeding part may include the capsule stacking parts. The capsule alignment part is called 'capsule seating part', the ice feeding part means an ice making part, and the coffee discharging part means a cup discharging part.

Referring back to FIG. 1, the touch panel 40 is disposed on the upper portion of the front surface of the front panel to provide advertisements, coffee menus, coffee making process, and so on for a consumer located at the outside of the coffee vending machine 10. Further, a locking device 32 is disposed on one side surface of the intermediate portion of the front panel 30 in such a manner as to lock the front panel 30 to allow an opening of the front surface of the body 20 to be closed.

The coffee vending machine 10 can prepare several types to tens of types of coffee capsules to instantly make coffee according to a consumer's purchase. At this time, the consumer can perform mobile payment through a predetermined payment site or a payment application by means of a user terminal such as a smart phone with mobile payment means built therein. Further, the consumer can perform mobile payment in such a manner as to allow the user terminal capable of conducting wireless payment to get close to or to touch the mobile payment unit 50. Furthermore, the consumer can perform payment for the coffee in such a manner as to insert card type payment means such as debit card, check card, and a credit card into the card payment unit 52. If the payment is finished, the coffee vending machine 10 makes the coffee during a short time of one minute to one minute thirty seconds according to the kind of coffee selected by the consumer and then provides the coffee for the consumer through the cup discharging part 60.

The control device 70 can control the whole operation of the coffee vending machine 10 such as operations of the touch panel 40, signal processing of the payment units, capsule transport, coffee brewing, coffee discharging, water feeding, cup feeding, and ice feeding. Further, the control device 70 can control or manage the coffee vending machine 10 through a network, collect data from sensors disposed in the coffee vending machine 10, and transmit the collected data to a manager's terminal or a data center of a server.

Before the type of coffee is selected by the consumer, as shown in FIG. 4, the coffee vending machine 10 can output advertisement images through the screen of the touch panel 40. The advertisement images are images that introduce the coffee capsules or images on famous persons enjoying the capsule type coffee. Further, the advertisement images are arbitrary images that are previously set through contracts of other advertisers.

According to setting of the coffee vending machine 10, the consumer can touch the touch panel 40 to activate a coffee menu screen from the advertisement images. Further, as shown in FIG. 4, the coffee vending machine 10 can display a brand coffee menu (inclusive of A to F) on the screen of the touch panel 40.

The coffee menu includes coffee made by basically utilizing espresso, Americano, and latte. The coffee menu may include espresso, doppio, espresso macchiato, espresso con pannar, cappuccino con pannar, cafe mocha, caramel macchiato, frappuccino, hazelnut, cafe breve, flat white, or similar coffee thereto.

Figure 5:
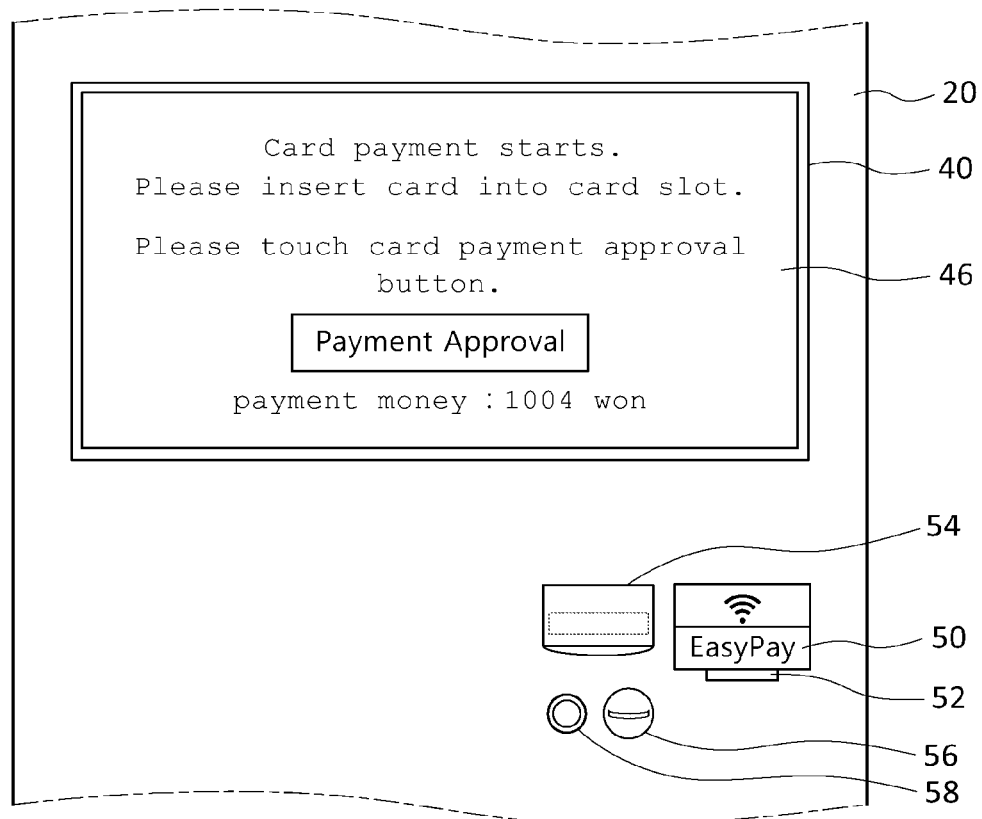
FIG. 5 is a partial front view showing a front portion of a coffee vending machine according to another embodiment of the present invention.

FIG. 5 is a partial front view showing a front portion of a coffee vending machine according to another embodiment of the present invention.

Referring to FIG. 5, the coffee vending machine 10 according to another embodiment of the present invention includes various payment units. In detail, the payment units include a mobile payment unit 50, a card payment unit 52, a bill payment unit 54 and a coin payment unit 56. The card payment unit 52 has a card insertion slot, the bill payment unit 54 a bill insertion slot, and the coin payment unit 57 a coin insertion slot. If a button 58 is pressed by a consumer, the coffee bending machine 10 can return remaining money through a given returning hole (not shown) to the consumer. Of course, as shown in FIG. 1, the coffee vending machine 10 can permit only both of the mobile payment and the card payment.

When a payment approval icon on a payment guide screen displayed on the touch panel 40 is clicked by the consumer, further, the coffee vending machine 10 is connected to a card company and a mobile payment server which manage or approve the payment so as to perform a process for the payment of the consumer. The payment guide screen includes information on payment types, payment methods, and amounts of payment money.

Figure 6:
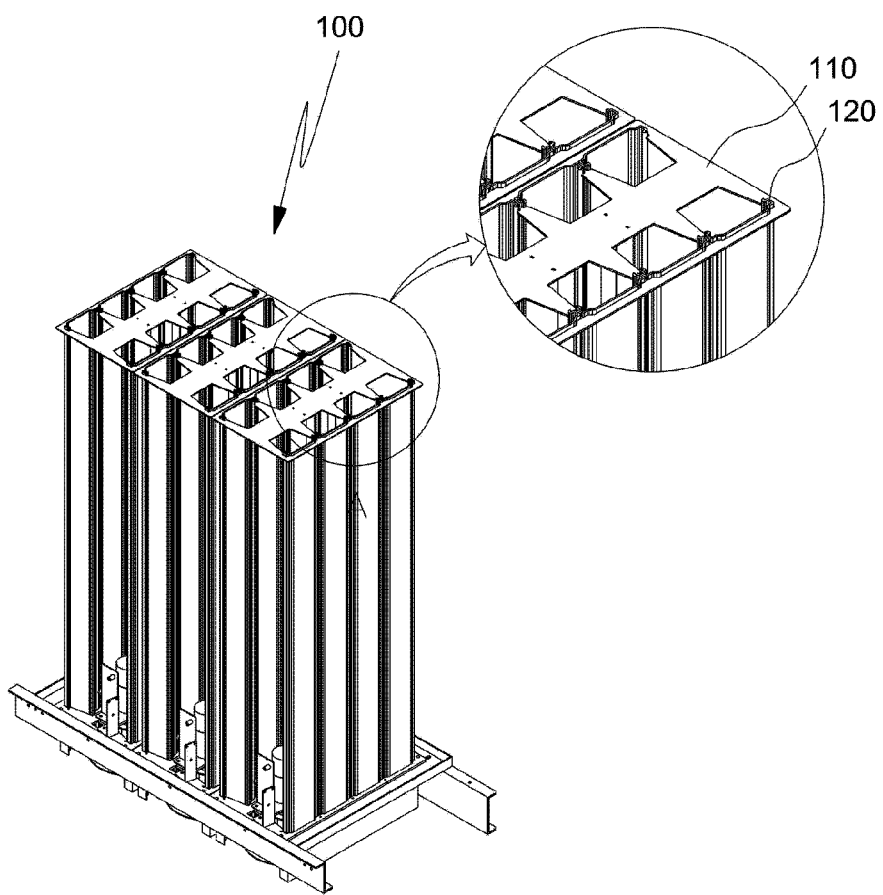
FIG. 6 is a perspective view showing capsule stacking parts adopted in the coffee vending machine according to another embodiment of the present invention.
Figure 7:
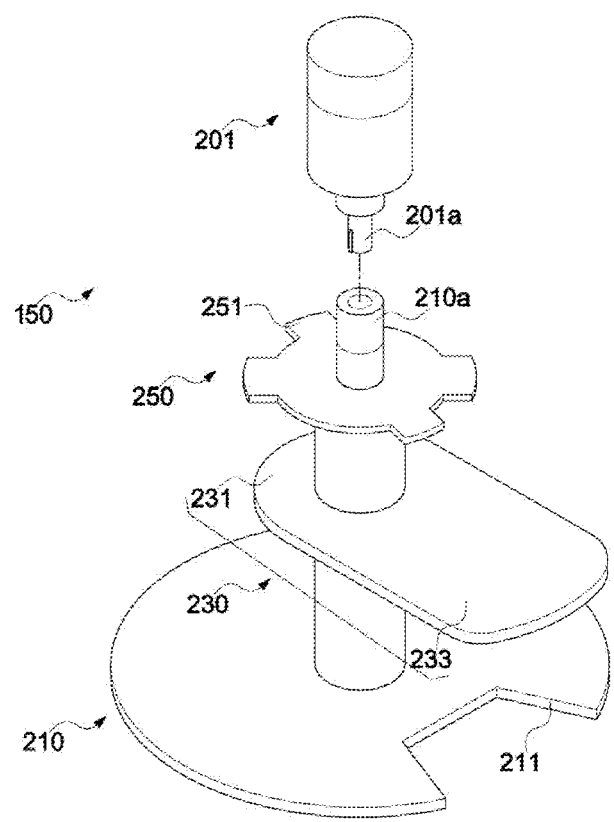
FIG. 7 is a perspective view showing a capsule feeding unit disposed on lower portions of the capsule stacking parts of the coffee vending machine of FIG. 6.
Figure 8:
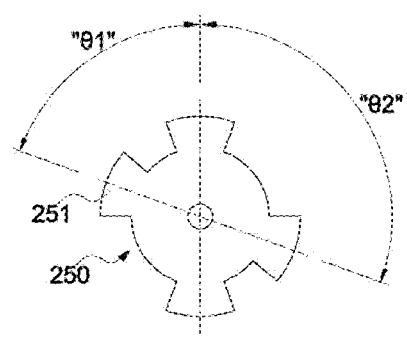
FIG. 8 is an enlarged plan view showing a third plate of the capsule feeding unit of FIG. 7.
Figure 9:
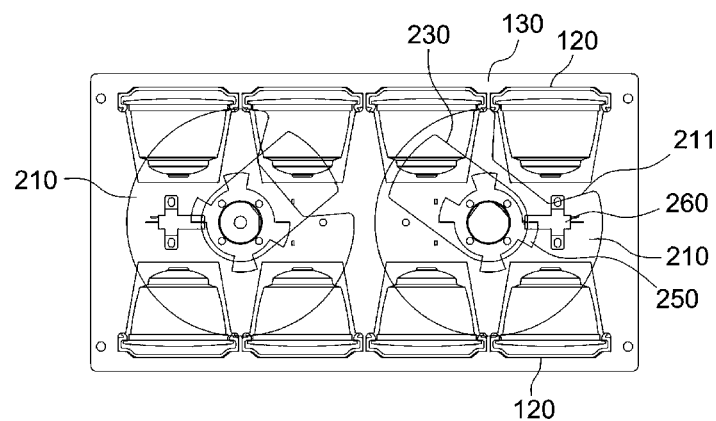
FIG. 9 is a partial bottom view showing an operating principle of the capsule feeding unit of FIG. 7.
Figure 10:
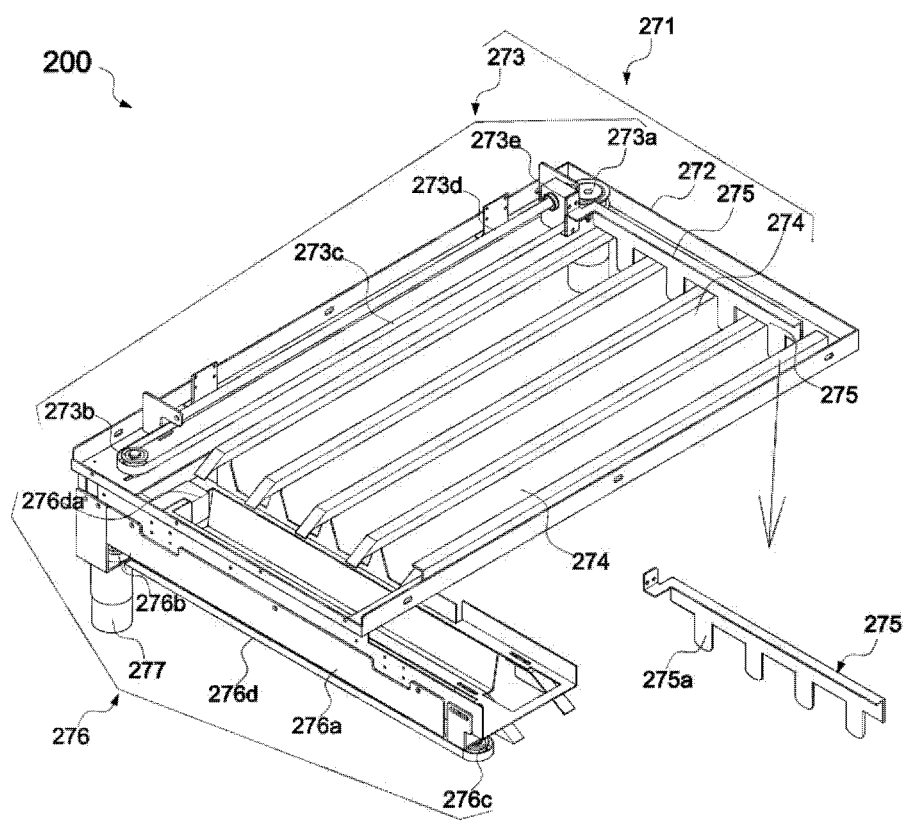
FIG. 10 is a perspective view showing a capsule feeding part adopted in the coffee vending machine according to one embodiment of the present invention.
Figure 11:
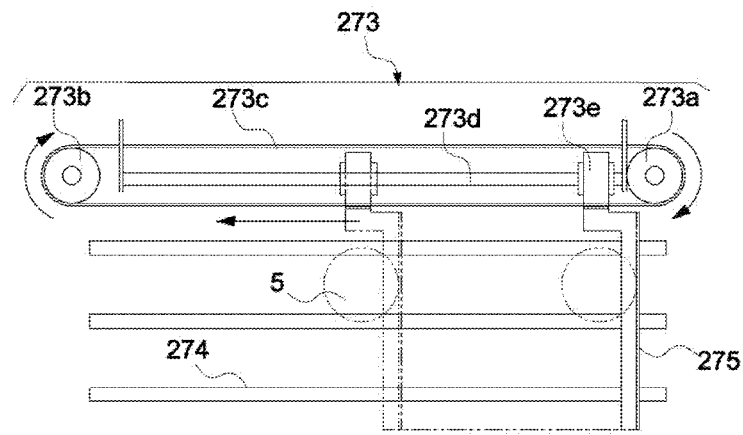
FIG. 11 is a schematic view showing an operating principle of the capsule feeding part of FIG. 10.

FIG. 6 is a perspective view showing capsule stacking parts adopted in the coffee vending machine according to another embodiment of the present invention. FIG. 7 is a perspective view showing a capsule feeding unit disposed on lower portions of the capsule stacking parts of the coffee vending machine of FIG. 6. FIG. 8 is an enlarged plan view showing a third plate of the capsule feeding unit of FIG. 7. FIG. 9 is a partial bottom view showing an operating principle of the capsule feeding unit of FIG. 7. FIG. 10 is a perspective view showing a capsule feeding part adopted in the coffee vending machine according to one embodiment of the present invention. FIG. 11 is a schematic view showing an operating principle of the capsule feeding part of FIG. 10.

Referring to FIGS. 6 to 11, the coffee vending machine (hereinafter, referred to as "vending machine") according to the present invention includes the capsule stacking parts 100, the capsule feeding part 200, the water feeding part (not shown), and the cup feeding part (not shown). Further, the vending machine 10 can include a card terminal, in addition to the bill insertion slot and the coin insertion slot.

The configurations of the coin insertion hole, the bill insertion slot, the button, and the drawing hole constituting an outer appearance of the vending machine 10 and the configurations of the water feeding part and the cup feeding part are well known in the art, and therefore, detailed explanations on them will be avoided.

The capsule stacking parts 100 have a shape of a tube having a circular or polygonal section shape in such a manner as to be arranged in a lattice form to allow capsules 5 stacked up and down to be easily drawn, while preventing the capsules 5 from being fluctuated, and even if not shown, the plurality of capsule stacking parts may be located in the vending machine 10.

Four capsule stacking parts 100 per one set are provided, and one capsule stacking part set has an opening (not shown) formed on the bottom in a first direction to easily discharge the capsule 5 therethrough and a cutoff hole 101 formed above the bottom on which the opening (not shown) is formed.

Further, the capsule stacking parts 100 are not limited to the shapes of the tubes arranged to the lattice form in a vertical direction, but it may have a plurality of members arranged in a vertical direction, each member having a plate type surface facing a top surface of the capsule so as to fix only wings of the capsule and both edges bent to an angle of about 180° or to a smaller angle than 180° so as to surround the wings of the capsule. Under the configurations of the capsule stacking parts 100, in a state where the capsule is lying on its side, an upper flange portion of the capsule is supportedly inserted into the hole of each capsule stacking part, and accordingly, in a state where a plurality of capsules is slantly erected, the capsules can be stacked in a vertical direction along frames arranged in the vertical direction on the capsule stacking parts (See FIGS. 6 and 9).

The four capsule stacking parts 100 are arranged as a first set in the first direction, and the four capsule stacking parts 100 as a second set are arranged to face the first set in such a manner as to be spaced apart from the first set, so that a plurality of groups each having the first set and the second set can be provided. According to the present invention, the capsule stacking parts 100 are arranged with three groups, but they are not limited thereto. In this case, each group has an upper frame 110 (hereinafter, referred to as "upper support frame") for supporting upper side ends of frames and a lower frame 130 (hereinafter, referred to as "lower support frame") for supporting lower side ends of the frames. The upper support frame 110 has holes for inserting the capsules into the vertical frames, and the lower support frame 130 has holes for discharging the capsules from the first and second frames according to the operations of the capsule feeding unit 150.

The cutoff hole 101 is formed just above the capsule 5 discharged by a second plate 230 as will be discussed later and is rotatable to cut off the discharging of the capsule 5 (See FIGS. 7 and 13).

The capsule feeding unit 150 is located on the bottom ends of the capsule stacking parts 100, in detail, on the bottom ends of the four capsule stacking parts 100 per one set. As shown in FIGS. 7 to 9, each capsule feeding unit 150 includes first to third plates 210, 230, and 250 and sensing means 260.

The first plate 210 is located on the bottom ends of the capsule stacking parts 100 and has a discharge hole 211 formed on the edge periphery easily rotated by a given angle by means of a driving device 201 so as to easily discharge the capsule 5 through an operation as will be discussed later (See FIG. 12).

Figure 12:
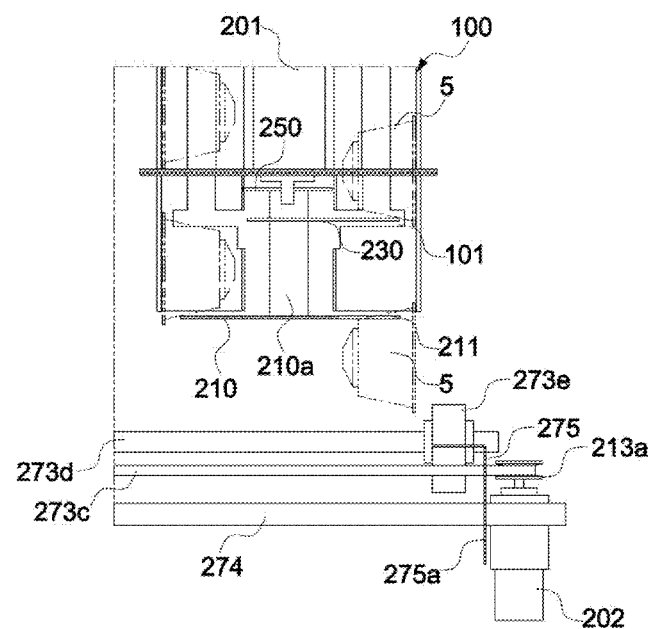
FIGS. 12 to 14 are side and perspective views showing some operating processes of the coffee vending machine according to one embodiment of the present invention.

A driving shaft 210a is located in the first direction passing through the center of the first plate 210, and as shown in FIG. 12, an output shaft 201a of the driving device 201 is directly connected to the upper end of the driving shaft 210a.

Desirably, the driving device 201 is one selected from a direct current (DC) motor and a stepping motor to control precise rotation to a given angle.

Referring back to FIG. 7, the second plate 230 is a shape of a generally rectangular plate spaced apart from the first plate 210 by a given distance above the first plate 210, and the second plate 230 has one end 231 and the other end 233. One end 231 is coupled to the driving shaft 210a, and the other end 233 is disposed on a portion facing one end 231. In detail, the second plate 230 is eccentrically coupled to the driving shaft 210a. The other end 233 of the second plate 230 desirably has a shape of an arch so that it can be rotated and inserted into the cutoff hole 101 formed on the lower ends of the capsule stacking parts 100 so as to prevent another capsule 5 located above the capsule 5 discharged through the discharge hole 211 of the first plate 210 from being discharged continuously through the discharge hole 211.

The third plate 250 is located above the second plate 230 with the above-mentioned configuration.

The third plate 250 is fitted to the upper end periphery of the driving shaft 210a and has a plurality of protrusions 251 radially formed therefrom in such a manner as to correspond to the number of capsule stacking parts 100. The protrusions 251 are formed in such a manner as to allow next protrusion 251 to be easily sensed by a sensing signal of the sensing means 260 as a kind of sensor located on one side thereof.

As shown in FIG. 8, two angles θ1 and θ2 of the protrusions 251 are about 70° and 110° so that the protrusions 251 are located appropriately on the lower end periphery of the four capsule stacking parts 100 as one set arranged symmetrically in the lattice form, but they are not limited thereto.

According to the present invention, further, the capsule feeding part 200 is located under the capsule feeding unit 150. The capsule feeding part 200 is called a capsule transport device.

Next, as shown in FIG. 10, the capsule transport device 200 is disposed under the third plates 250 of the capsule feeding unit 150 and has first and second transporters 271 and 276 for moving and discharging the capsule 5 discharged in the first direction to a second direction.

The first transporter 271 is adapted to transport the capsule 5 discharged from the capsule feeding unit 150 to one side thereof in a second direction and includes a first frame 272, a first driver 273, first transport lanes 274, and a first capsule transport member 275.

The first frame 272 has a shape of a rectangle, and the first driver 273 is located on one side of the first frame 272 in a longitudinal direction of the first frame 272. The first driver 273 has driving and driven pulleys 273a and 273b located symmetrically on one side of the first frame 272 in the longitudinal direction of the first frame 272 and a tracked pulley type of connection member 273c coupled to the outer peripheries of the driving and driven pulleys 273a and 273b.

The connection member 273c is one selected from a timing belt, V-belt, and chain. As shown in FIG. 12, the driving pulley 273a is rotated on one side or the other side by means of a driving device 202 located on the underside thereof.

A transport block 273e having a shape of a hexahedron block is coupled to one side of the connection member 273c in such a manner as to be moved forward and backward by means of the connection member 273c moving in the second direction through the rotation of the driving pulley 273a.

A guide rail 273d, which is disposed above the connection member 273c in the longitudinal direction of the intermediate portion of the connection member 273c, is passed through the transport block 273e, so that the transport block 273e can be easily moved in the forward and backward directions along the guide rail 273d.

So as to allow the capsule 5 drawn to one side of the first driver 273 to be easily transported, at least one or more rows of first transport lanes 274 are provided linearly in such a manner as to support both sides of the upper portion of the capsule 5.

On the other hand, the first capsule transport member 275 is disposed on one side of the transport block 273e in the second direction to allow the capsules 5 seated on the first transport lanes 275 to be easily moved. The first capsule transport member 275 has vertical supports 275a protruding downward therefrom every first transport lane section in such a manner as to allow the capsules 5 from being easily moved to one side direction.

The second transporter 276 is disposed on one side of the first transporter 273 in a perpendicular direction to the first transporter 273. The second transporter 276 includes a second frame 276a located in the perpendicular direction to the first transporter 273, driving and driven pulleys 276b and 276c located symmetrically on both ends of the second frame 276a, a tracked pulley type of connection member 276d coupled to the driving and driven pulleys 276b and 276c, a second capsule transport member 276da coupled to one side of the connection member 276d, and a driving device 277 directly connected to the underside of the driving pulley 276b in the first direction.

The configuration of the second transporter 276 is the same as of the first transporter 271 except that the second transporter 276 is configured in one column, and therefore, a detailed explanation on the second transporter 276 will be avoided.

According to the present invention, further, the capsule stacking parts are arranged as one set of four in the lattice form in the first direction above the capsule feeding part, but they are not limited thereto. In detail, at least one or more capsule stacking part sets formed of one or more capsule stacking containers may be arranged in the first direction.

Hereinafter, an explanation on a main operating principle of the coffee vending machine 10 according to the present invention will be in detail given with reference to FIGS. 12 to 14.

Figure 13:
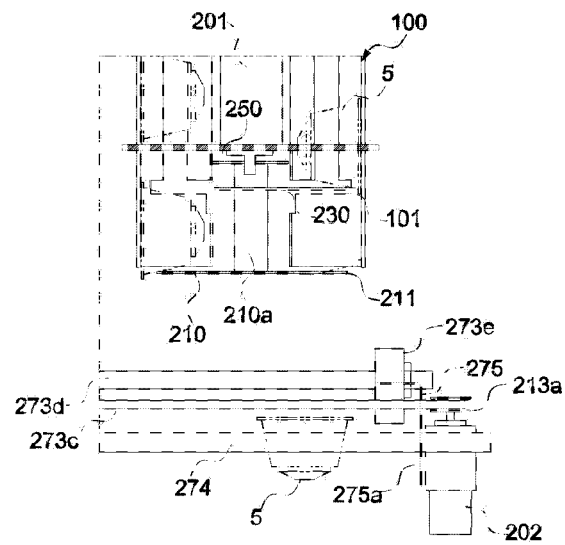
Figure 14:
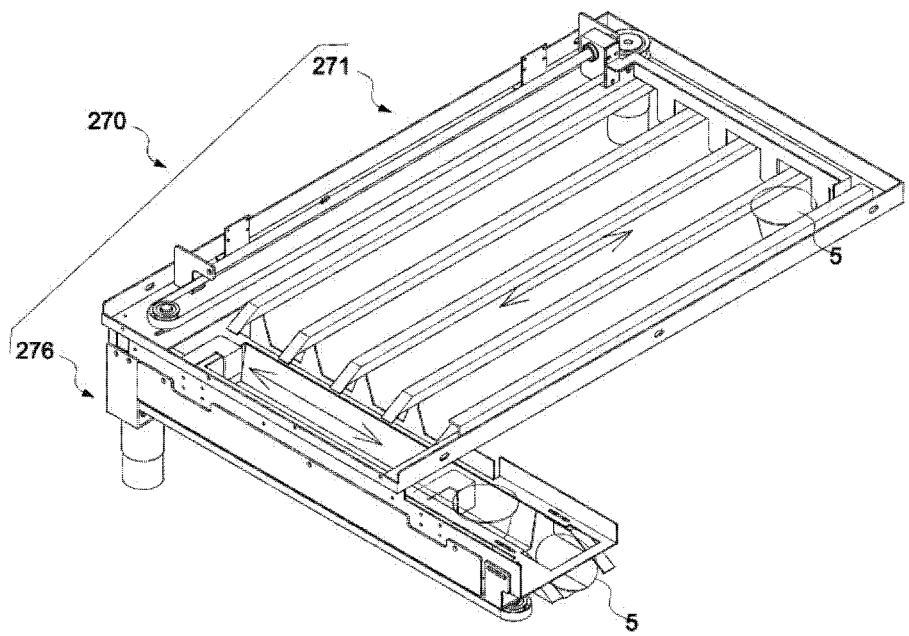

FIGS. 12 to 14 are side and perspective views showing some operating processes of the coffee vending machine according to one embodiment of the present invention.

First, a payment process is performed by inserting coin, bill, or card into the coin insertion slot, the bill insertion slot, or the card terminal located on the vending machine (not shown) through a customer, and next, if a coffee selection button is pressed by the customer, the first to third plates 210, 230 and 250 coupled to the driving shaft 201a are rotated by a given angle by means of the rotation of the driving device 201 of the capsule feeding unit 150.

In this case, if one of the protrusions 251 of the third plate 250 is sensed by means of the sensing means 260, the rotation of the first to third plates 210, 230 and 250 is stopped, and the time point at which their rotation is stopped is a time point at which the capsule 5 is discharged to the discharge hole 211 of the first plate 210 as shown in FIG. 12.

When the discharging of the capsule 5 is finished, the second plate 230 is inserted into the cutoff hole 101 formed on the other side lower end of the capsule stacking parts 100 to prevent another capsule 5 from being discharged. The operations are organically connected, and whenever the button (not shown) is pressed, the first to third plates 210, 230 and 250 are rotated to discharge the capsules 5.

The capsule 5 discharged from the capsule stacking parts 100 is seated onto one of the first transport lanes 274 of the first transporter 271 of the capsule transport device 270.

Simultaneously, the connection member 273c connected in the pulley form with the driving and driven pulleys 273a and 273b is moved in one side direction thereof by means of the rotation of the driving and driven pulleys 273a and 273b, and the capsule 5 seated onto one of the first transport lanes 274 of the first transporter 271 is transported to one end by means of the first capsule transport member 275 whose one end is coupled to the transport block 273e coupled to the connection member 273c.

The transported capsule 5 is seated onto the second frame 276a of the second transporter 276, and simultaneously, the driving and driven pulleys 276b and 276c are rotated by means of the driving device 277 located on the second frame 276a. The connection member 276d is moved through the rotation of the driving and driven pulleys 276b and 276c, and accordingly, the capsule 5 is pushed toward one side and transported to the coffee brewing part 500 by means of the second capsule transport member 276da coupled to the connection member 276d.

Figure 15:
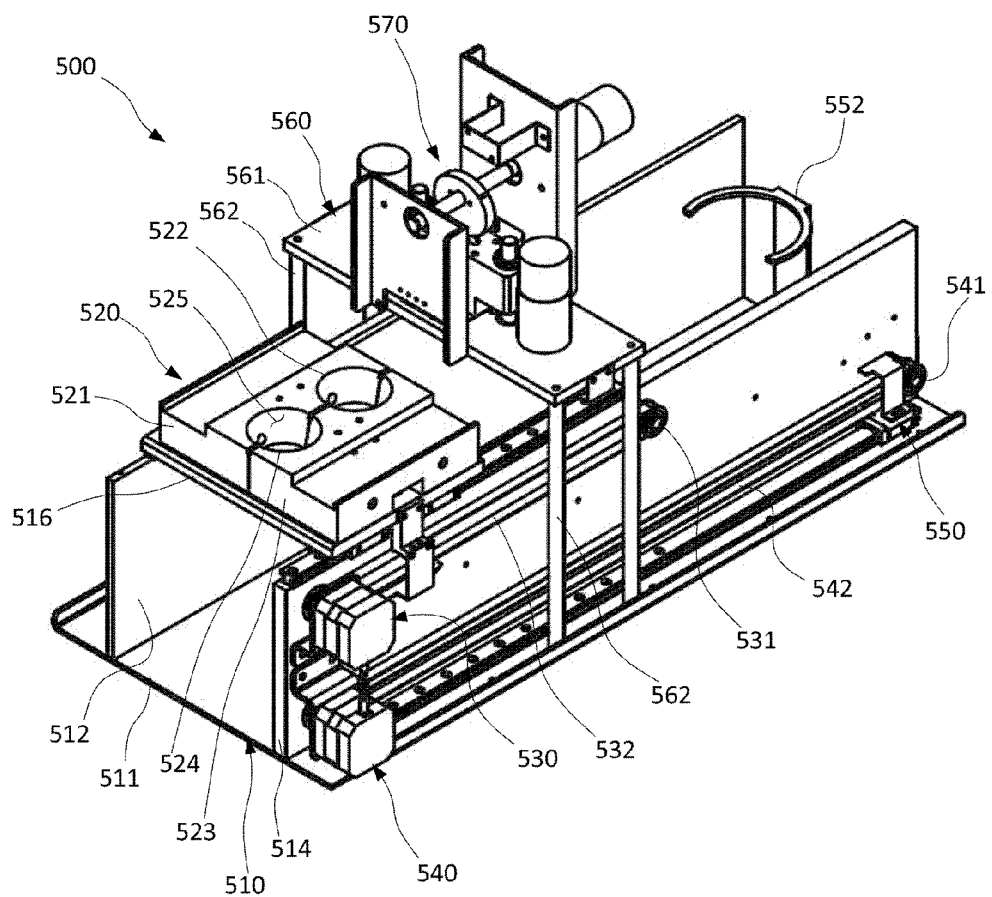
FIG. 15 is a perspective view showing a coffee brewing part adopted in the coffee vending machine according to one embodiment of the present invention.
Figure 16:
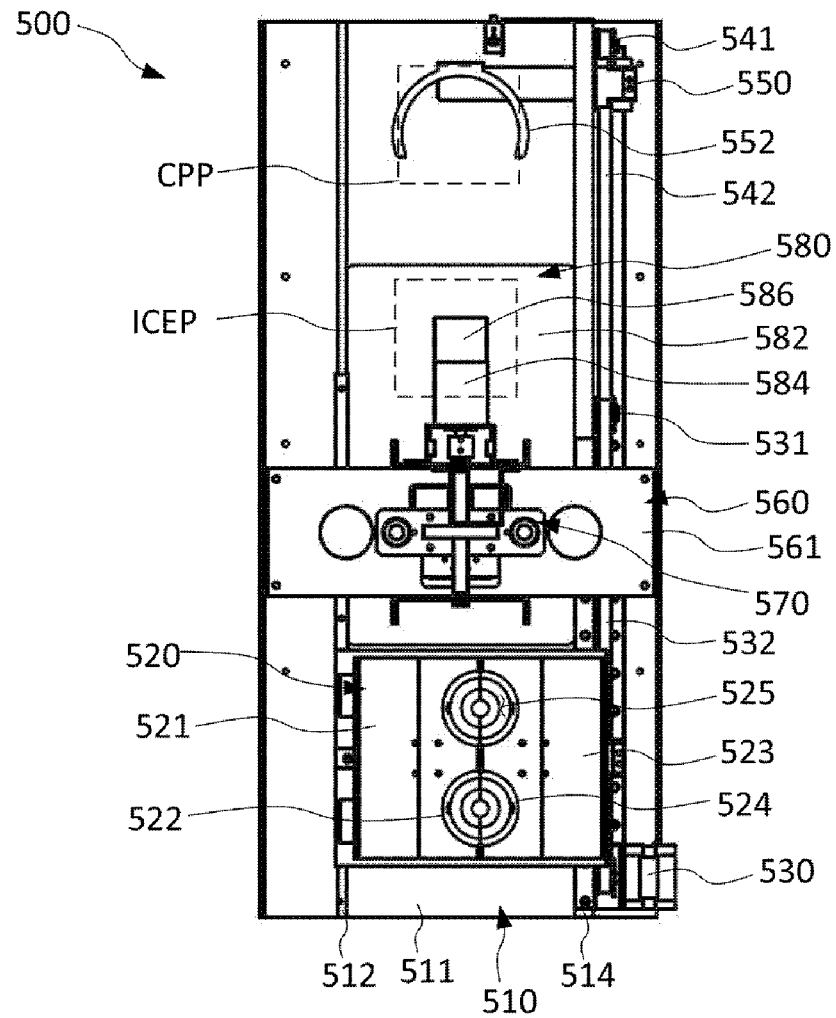
FIG. 16 is a plan view showing the coffee brewing part of FIG. 15.
Figure 17:
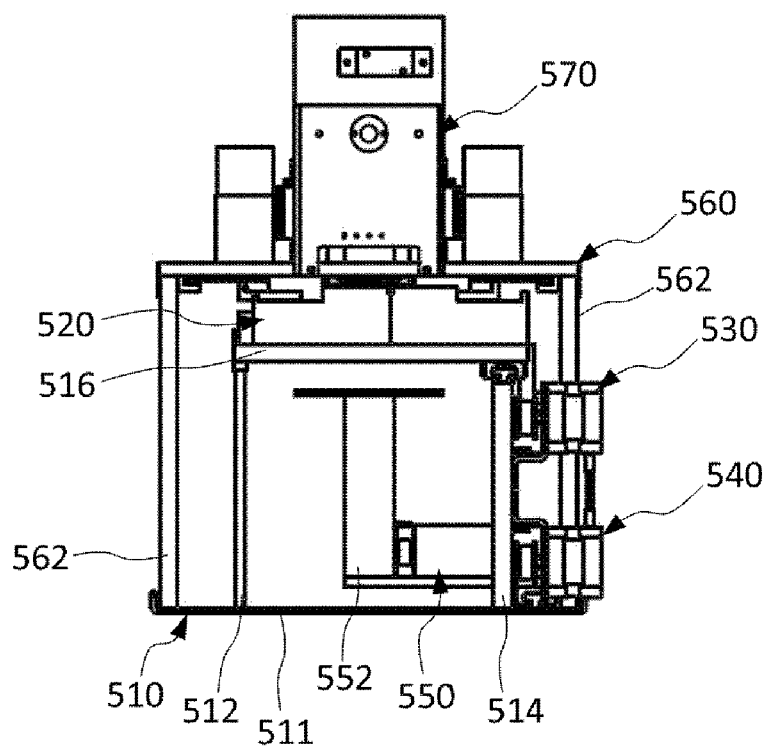
FIG. 17 is a front view showing the coffee brewing part of FIG. 15.

FIG. 15 is a perspective view showing a coffee brewing part adopted in the coffee vending machine according to one embodiment of the present invention. FIG. 16 is a plan view showing the coffee brewing part of FIG. 15. FIG. 17 is a front view showing the coffee brewing part of FIG. 15.

Referring to FIG. 15, the coffee brewing part 500 of the coffee vending machine 10 according to the present invention includes a support frame 510, a capsule supporter 520, a third transporter 530, a fourth transporter 540, a cup holder supporter 550, a sub frame 560, a pressurizing structure 570, and a capsule container discharger 580.

The capsule supporter 520 and the pressurizing structure 570 are disposed above the support frame 510, and the third transporter 530, the fourth transporter 540, and the cup holder supporter 550 are disposed on one side surface of the support frame 510. The capsule container discharger 580 is disposed on the bottom of the support frame 510. The pressurizing structure 570 is located above the support frame 510 by means of the sub frame 560 fixed to the support frame 510.

Now, the respective components of the coffee brewing part 500 will be in detail explained. First, the support frame 510 includes a base plate 511, a first frame 512, and a second frame 514. The base plate 511 has an opening formed at the center thereof. The first frame 512 has a shape of a plate extended from one transverse side of the base plate 511 in a longitudinal direction. The second frame 514 has a shape of a plate extended from the other side in a transverse direction opposite to one side of the base plate 511 in a longitudinal direction. Through the arrangements of the base plate 511, the first frame 512, and the second frame 514, the support frame 510 has a shape of a right-angled ditch or channel in such a manner as to be open on top and front and rear sides in the longitudinal direction.

Under the configuration where top of the support frame 510 is open, further, the support frame 510 includes a top plate 516 disposed on top thereof to support the capsule supporter 520. The top plate 516 is moved along the top edges of the first plate 512 and the second plate 514 by means of the third transporter 530. To this end, rail type guides are located along the top edges of the first plate 512 and the second plate 514. Also, the top plate 516 has a structure which is divided according to the operation of the capsule supporter 520, and otherwise, it supports only at least a portion of the underside or side surface of the capsule supporter 520, so that when the capsule 5 falls in a direction of gravity according to the operation of the capsule supporter 520, the top plate 516 does not inhibit free fall of the capsule 5.

The capsule supporter 520 is supported against the top plate 516 and has seating grooves 525 formed at the center of the top surface thereof. One or two seating grooves 525 are formed. The two seating grooves 525 can be simultaneously used when cafe latte as a kind of coffee is brewed.

The capsule supporter 520 is divided into two parts, that is, a first portion seating part 521 and a second portion seating part 523. The first portion seating part 521 and the second portion seating part 523 are separably adjacent or contacted with each other on their one side surface. The first portion seating part 521 has a first semicircular concave portion 522 formed on the side surface facing the second portion seating part 523 in such a manner as to be extended toward the upper side thereof, and the second portion seating part 523 has a second semicircular concave portion 524 formed on the side surface facing the first portion seating part 521 in such a manner as to be extended toward the upper side thereof. If the first portion seating part 521 and the second portion seating part 523 are adjacent thereto or contacted with each other, the first concave portion 522 and the second concave portion 524 form the seating groove 525, and the capsule transported from the capsule transport part is seated onto the seating groove 525.

Further, the first portion seating part 521 and the second portion seating part 523 of the capsule supporter 520 can be reciprocally moved in a direction where the first plate 512 and the second plate 514 face each other or in a direction perpendicular to their facing surface. To this end, the first portion seating part 521 and the second portion seating part 523 are adjacent to each other or distant from each other in the facing direction according to the operation of driving means disposed on the top plate 516. The driving means includes a motor.

The third transporter 530 is located on one surface of the first frame 512 or the second frame 514. The third transporter 530 includes driving means located on one side of one surface of the second frame 514, a roller 531 spaced apart from the driving means by a given distance, and a chain or belt 532 located between the driving means and the roller 531. One side of the chair or belt 532 is rotatably coupled to a rotary shaft of the driving means. The given distance is determined according to a second position as will be discussed later.

Under the above-mentioned configuration of the third transporter 530, the capsule supporter 520 can be moved by a given distance by means of the third transporter 530. In detail, the capsule seated onto the seating groove 525 of the capsule supporter 520 can be moved from a first position to the second position. The first position is a position corresponding to an end portion of the capsule transport part or a capsule outlet, and the second position is a position just below the pressurizing structure 570.

The fourth transporter 540 is located on one surface of the first frame 512 or the second frame 514. The fourth transporter 540 includes driving means located on one side of one surface of the second frame 514 under the driving means of the third transporter 530, a roller 541 spaced apart from the driving means by a given distance, and a chain or belt 542 located between the driving means and the roller 541. One side of the chair or belt 542 is rotatably coupled to a rotary shaft of the driving means. The given distance is determined according to a position where a cup is fed to a cup holder 552 from the cup stacking parts or the cup feeding part above the support frame 510.

Under the above-mentioned configuration of the fourth transporter 540, the cup holder 552 can be moved by a given distance by means of the fourth transporter 540. In detail, the cup seated onto the cup holder 552 can be moved from a third position CPP to a fifth position and can be moved from the fifth position to the third position CPP. The fifth position is just below the pressurizing structure 570, and the third position CPP is a position at which the cup is discharged. In detail, the third position CPP is an area below the cup stacking parts or the cup feeding part.

So as to feed ice to the cup from the ice supplier or ice making part located between the cup feeding part and the pressurizing structure 570 under the control of the control device, further, the fourth transporter 540 is configured to allow the cup holder 522 to stay at a fourth position ICEP at which the ice is fed during the cup is moved from the third position CPP to the fifth position. The ice making part has a structure in which the ice is stored and discharged, and especially, it has a component through which a solid like ice is made of liquid like water.

The cup holder supporter 550 is connected to the belt 542 of the fourth transporter 540 and is reciprocally moved between the third position and the fifth position by means of the belt 542 moved by the operation of the fourth transporter 540. The cup holder supporter 550 has a shape of an extended bar passing through an opening extended in form of a linear channel along the third position and the fifth position on the second frame 514. One end of the cup holder supporter 550 is fixed to the belt 542, and the other end is connected to a body of the cup holder 552. The cup holder supporter 550 may be formed integrally with the cup holder 552.

The sub frame 560 is adapted to locate the pressurizing structure 570 above the support frame 510, while placing the capsule supporter 520 between the support frame 510 and the sub frame 560. In detail, the sub frame 560 is spaced apart from top of the support frame 510 to support the pressurizing structure 570 thereagainst. The sub frame 560 includes a support plate 561 for supporting the pressurizing structure 570 and column frames 562 located to a given height on the base plate 511 or the vertical plates (512 and/or 514) to support the support plate 561. When the pressurizing structure 570 and the capsule supporter 520 are arranged in the first direction, the support plate 561 has an opening adapted to insert or pass an end portion, nozzle or compression part of the pressurizing structure 570 thereinto or therethrough (See FIG. 22).

The pressurizing structure 570 includes a pressurizing device and the compression part. The pressurizing device has a pipe for supplying a fluid and a fluid supplier connected to one end of the pipe. The fluid supplier is connected to a commercial water pipe like city water pipe or to a water tank located inside the vending machine. The other end of the pipe is exposed to the underside of the compressing member. The fluid is supplied or injected into the other end of the pipe.

The pressurizing structure 570 is supported against the support plate 561 of the sub frame 560 and is passed through the support plate 561 to supply the fluid to the capsule seated onto the capsule supporter 520. The fluid includes water, steam, and so on and is supplied at an atmosphere of predetermined temperature and pressure.

According to the present invention, furthermore, the pressurizing structure 570 is supported against the sub frame 560 directly fixed to the base plate 511 of the support frame 510, but without being limited thereto, the pressurizing structure 570 may be supported against the sub frame 560 fixed to the vertical frames 512 and 514 of the support frame 510. Of course, the pressurizing structure 570 can be supported by a combined structure of the frames.

As shown in FIG. 17, the capsule container discharger 580 is coupled to the opening formed on the center of the base plate 511. The capsule container discharger 580 includes a plurality of side wall members 582 as slant surfaces coupled to the opening of the base plate 511, a bottom slant surface 584 located on the bottom having a shape of a general square cone formed by the side wall members 582, a discharge hole 586 formed at a position where some of the side wall members 582 and the bottom slant surface 584 are collected. At least a portion of an accommodation space of the capsule container discharger 580 is located on an extended line from the arrangement in the first direction connecting the pressurizing structure 570 and the capsule supporter 520.

FIGS. 18 to 21 are perspective and front views showing other operating processes of the coffee vending machine according to one embodiment of the present invention.

Figure 18:
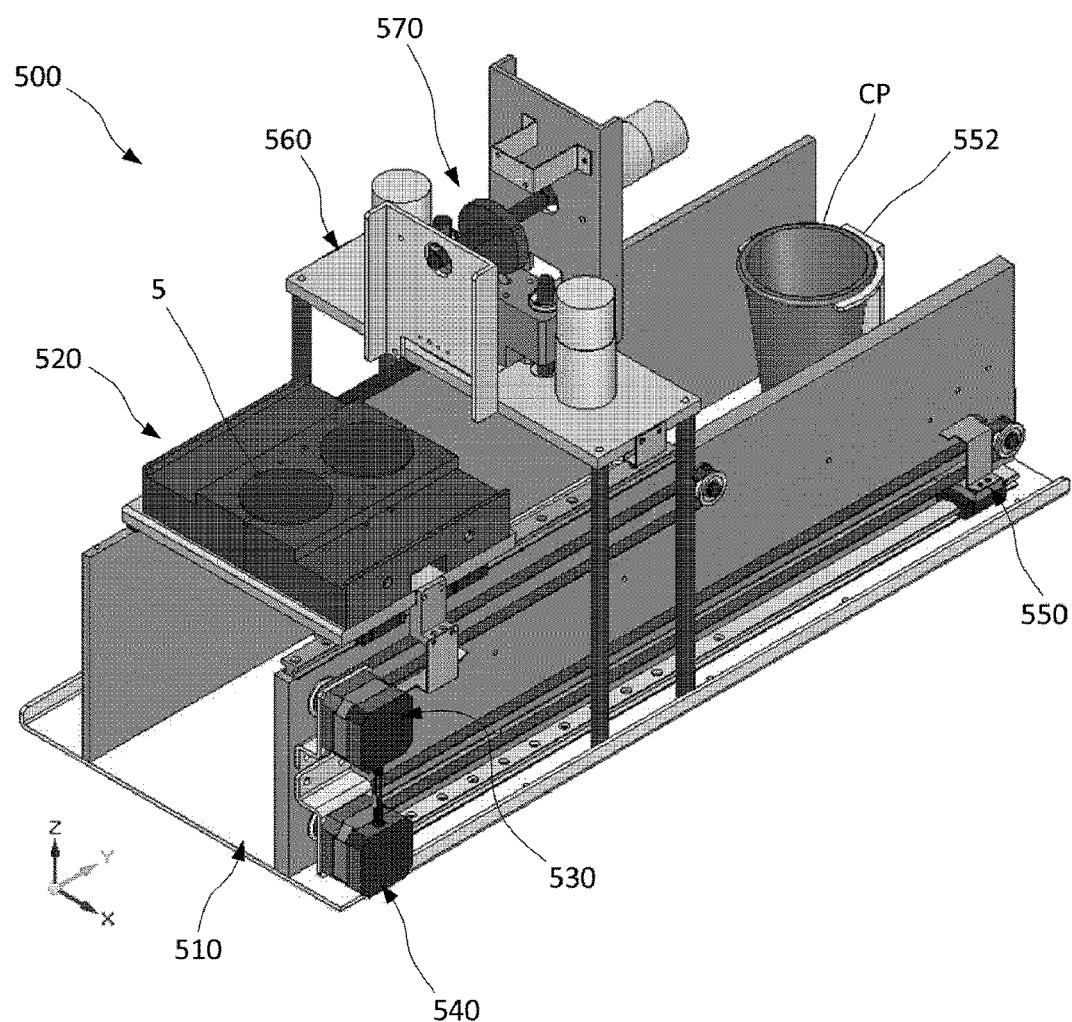
FIGS. 18 to 21 are perspective and front views showing other operating processes of the coffee vending machine according to one embodiment of the present invention.

First, as shown in FIG. 18, the capsule 5 transported through the capsule feeding part 200 is seated on the capsule supporter 520, and the cup CP fed through the cup feeding part is seated onto the cup holder 522.

Figure 19:
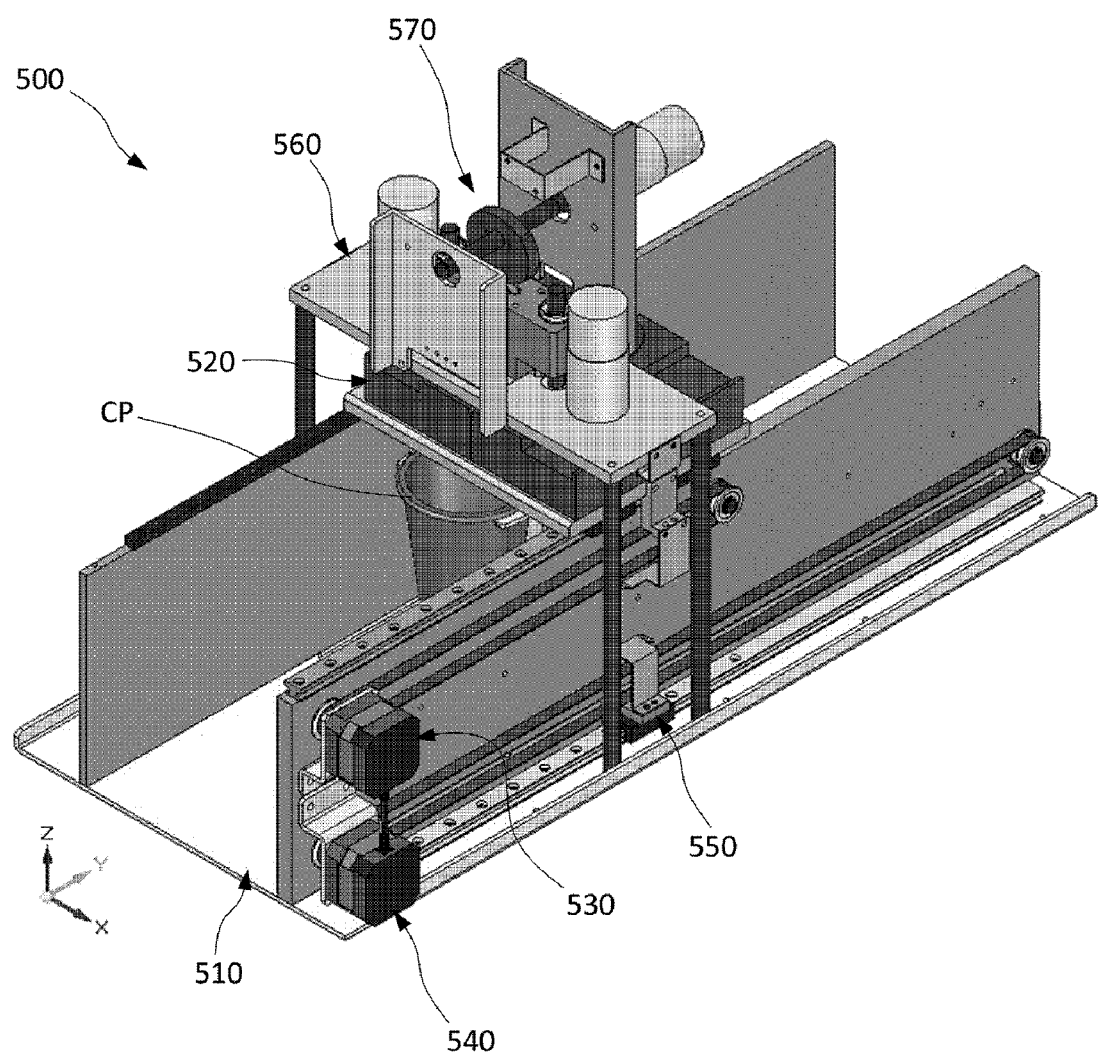

Next, as shown in FIG. 19, the capsule supporter 520 is moved under the pressurizing structure 570 by means of the operation of the third transporter 530, and the cup CP supported against the cup holder 522 is moved under the capsule supporter 520 by means of the operation of the fourth transporter 540. At least the portion of the accommodation space of the capsule container discharger 580 is located under the cup CP.

Figure 20:
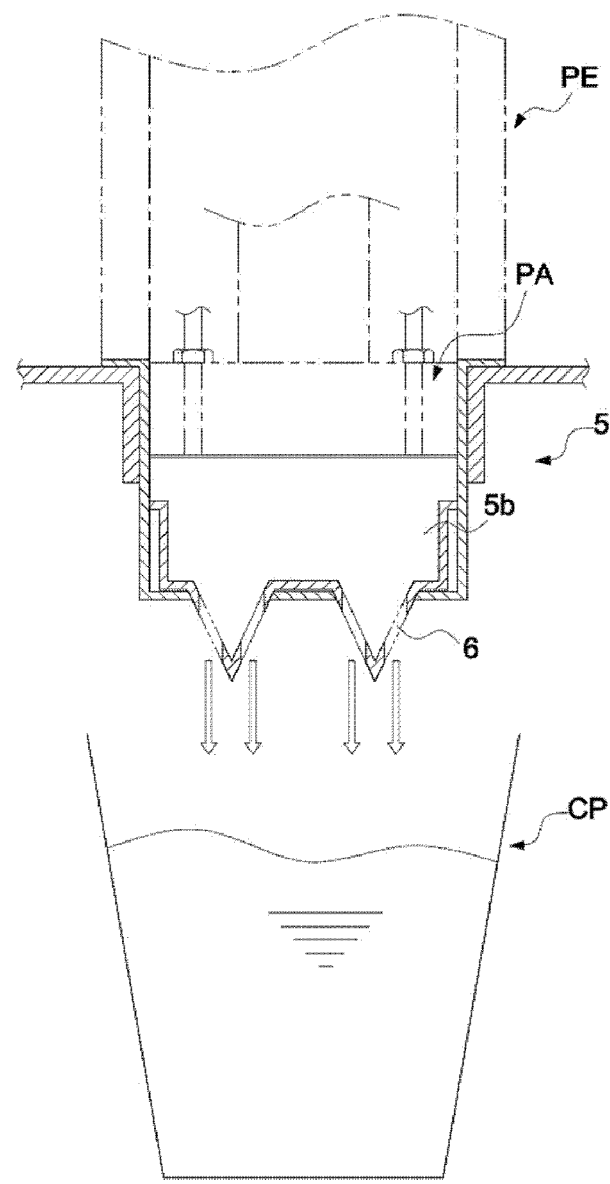

After that, as shown in FIG. 20, the pressurizing device PE of the pressurizing structure 570 is operated to allow the compression part PA to come into close contact with top of the capsule 5 under the control of the control device, and high pressure water is supplied to the interior of the capsule 5 from nozzles disposed at the lower portion of the compression part PA. In detail, coffee powder 5b contained in the capsule 5 is compressed against top of the capsule 5 by means of the compression part PA so that an aqueous solution for coffee pressurized toward one side direction is discharged below the capsule 5. The coffee powder 5b includes ground coffee beans.

In more detail, the pressurizing device PE compresses the coffee powder and simultaneously allows the nozzles to punch the cover of the capsule 5 to supply high pressure water to the capsule 5, so that the coffee powder stored in the capsule 5 becomes the aqueous solution or diluted with the water and makes coffee having inherent flavor and taste. Next, the coffee freely falls to the cup CP.

Figure 21:
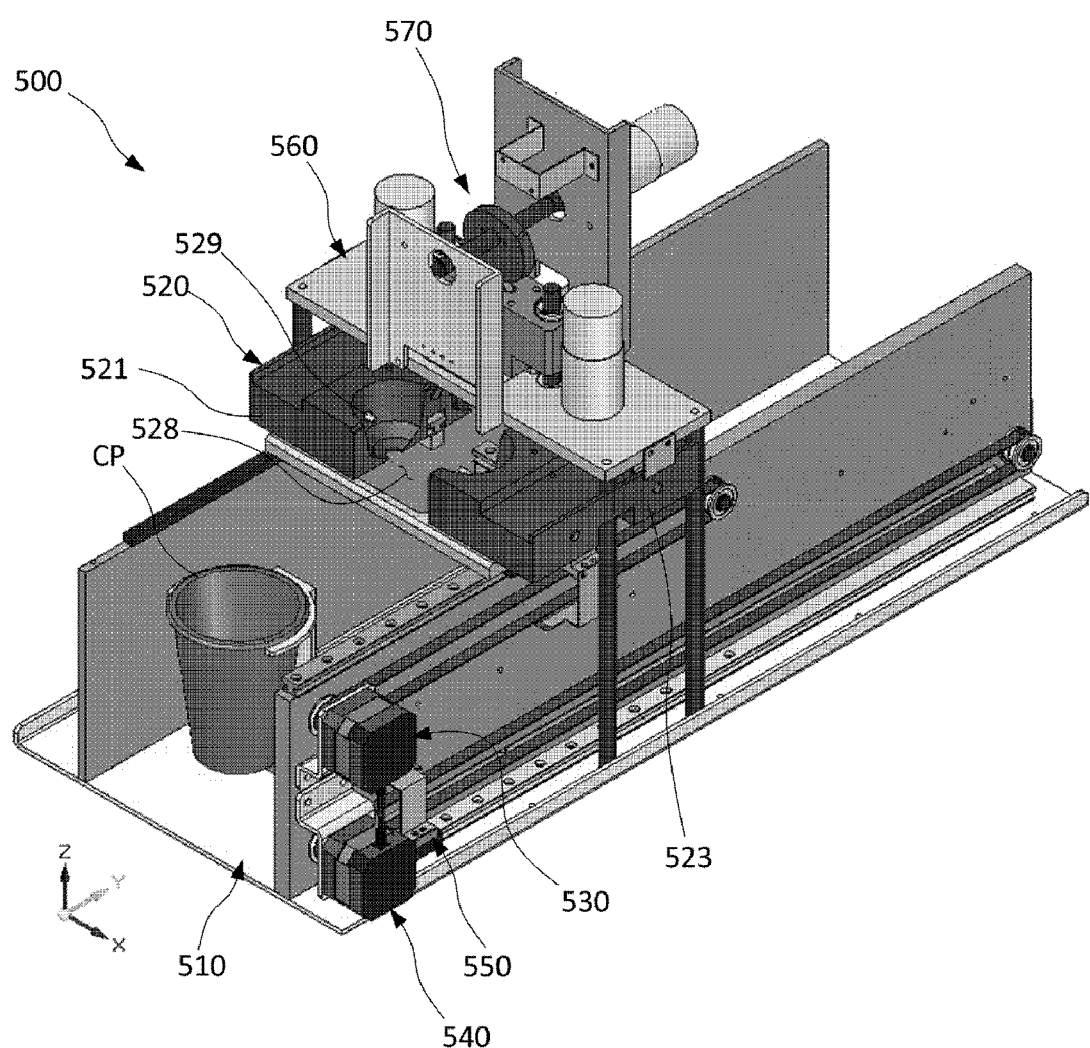

Next, as shown in FIG. 21, the coffee poured into the cup CP is moved to the cup discharging part. If the cup CP located under the pressurizing structure 570 is moved to the cup discharging part, the first portion seating part 521 and the second portion seating part 523 of the capsule supporter 520 are spaced apart from each other by means of the operation of the motor under the control of the control device, and the capsule container can fall down through a space 528 formed between the first portion seating part 521 and the second portion seating part 523 spaced apart from each other. The capsule container in which the coffee powder is compressed can be discharged to the outside of the support frame 510 through the discharge hole 586 of the capsule container discharger 580.

Further, at least one of the first portion seating part 521 and the second portion seating part 523 has a hidden protruding piece or hidden protruding member 529 protruding from the inner peripheral wall of the opening thereof in such a manner as to be moved in the opposite direction thereto when the first portion seating part 521 and the second portion seating part 523 are spaced apart from each other so that the capsule container is pushed from the seating groove and falls well in the direction of gravity.

Figure 22:
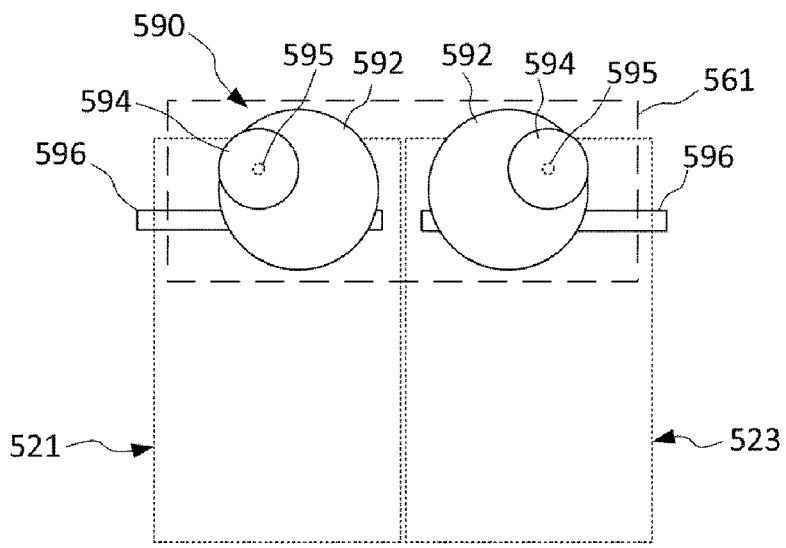
FIG. 22 is a schematic block diagram showing a capsule container discharging structure adopted in a capsule supporter of the coffee vending machine according to one embodiment of the present invention.
Figure 23:
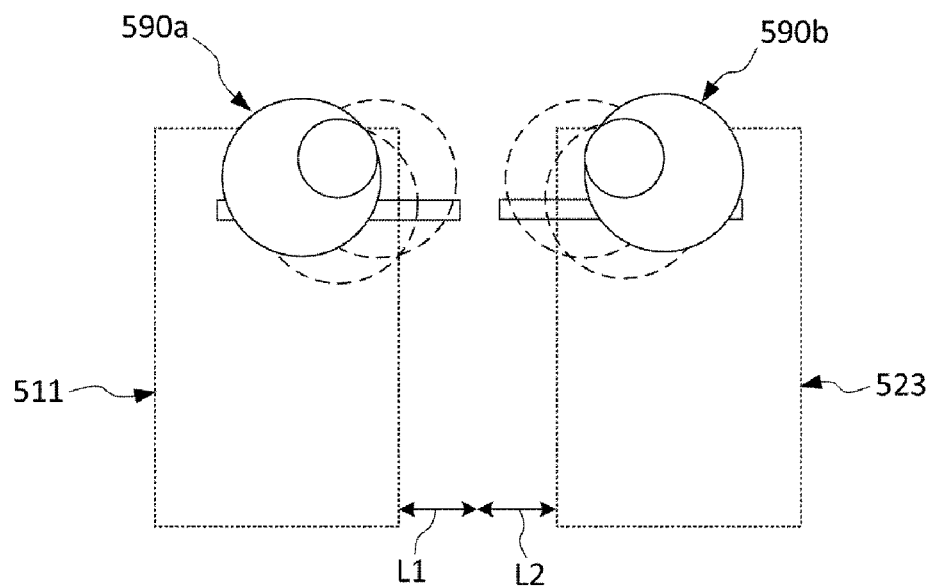
FIG. 23 is a schematic block diagram showing an operating principle of the capsule supporter of FIG. 22.

FIG. 22 is a schematic block diagram showing a capsule container discharging structure adopted in the capsule supporter of the coffee vending machine according to one embodiment of the present invention. FIG. 23 is a schematic block diagram showing an operating principle of the capsule supporter of FIG. 22.

Referring to FIG. 22, a capsule container discharging structure 590 according to the present invention includes a rotary plate 592 and a motor 594 whose rotary shaft is eccentrically coupled to the rotary plate 592. The motor 594 is located on top of the support plate 561 of the sub frame 560, and the rotary plate 592 is located on the underside of the support plate 561. In detail, the rotary shaft of the motor 594 is eccentrically coupled to one side of top of the rotary plate 592 through an opening or through hole of the support plate 561.

Two capsule container discharging structures 590 are located, and in this case, they include a first discharging structure 590a and a second discharging structure 590b.

The rotary shaft 595 of the motor 594 is coupled to a position distant from the center of the rotary plate 592 having a shape of a circular plate.

The rotary plate 592 is coupled to the first portion seating part 521 and the second portion seating part 523 of the capsule supporter 520 located on the underside thereof through given connection means. The connection means includes a first concave and convex portion formed unitarily with the surface of the rotary plate 592 or the surfaces of the first portion seating part 521 and the second portion seating part 523 and a second concave and convex portion formed unitarily with the surfaces of the first portion seating part 521 and the second portion seating part 523 or the surface of the rotary plate 592 facing the first concave and convex portion.

The first concave and convex portion and the second concave and convex portion are insertedly coupled to each other in the first direction, and when the rotary plate 592 is eccentrically moved in the state where the first concave and convex portion and the second concave and convex portion are inserted into each other, one of the first portion seating part 521 and the second portion seating part 523 can move the other so that the first portion seating part 521 and the second portion seating part 523 are parallel to a first plane on which the eccentric movement is performed and are linearly reciprocated in the second direction perpendicular to the first direction. The first direction corresponds to a vertical direction, but it is not limited thereto. The second direction corresponds to a horizontal direction, but it is not limited thereto.

So as to allow the first portion seating part 521 and the second portion seating part 523 to be linearly reciprocated, a guide bar 596 is coupled to the first portion seating part 521, and another guide bar 597 is coupled to the second portion seating part 523. The guide bars 596 can be inserted into the opening or through hole extended in the horizontal direction on the corresponding seating parts. The guide bars 596 are formed of linear motion (LM) guides having rolling guide structures and capable of supporting load applied from up, down, left and right directions. The guide bars 596 can guide moving paths of the corresponding seating parts when the corresponding seating parts reciprocate a first distance L1 or a second distance L2 in the second direction.

As shown in FIG. 23, when the first discharging structure 590*a* and the second discharging structure 590*b* are rotated within a given angle or rotated several times, the first portion seating part 521 and the second portion seating part 523 coupled to each other by means of the respective discharging structures and the connection means can be linearly moved by the first and second distances L1 and L2 in a facing direction or in a direction distant from each other. The first distance L1 and the second distance L2 are the same as each other, but without being limited thereto, they may be different from each other.

According to the present invention, the eccentric movements are converted into the linear movements to form the space between the first portion seating part 521 and the second portion seating part 523, thereby allowing the capsule container supported against the first portion seating part 521 and the second portion seating part 523 to be discharged below through the space formed by the seating parts.

Figure 24:
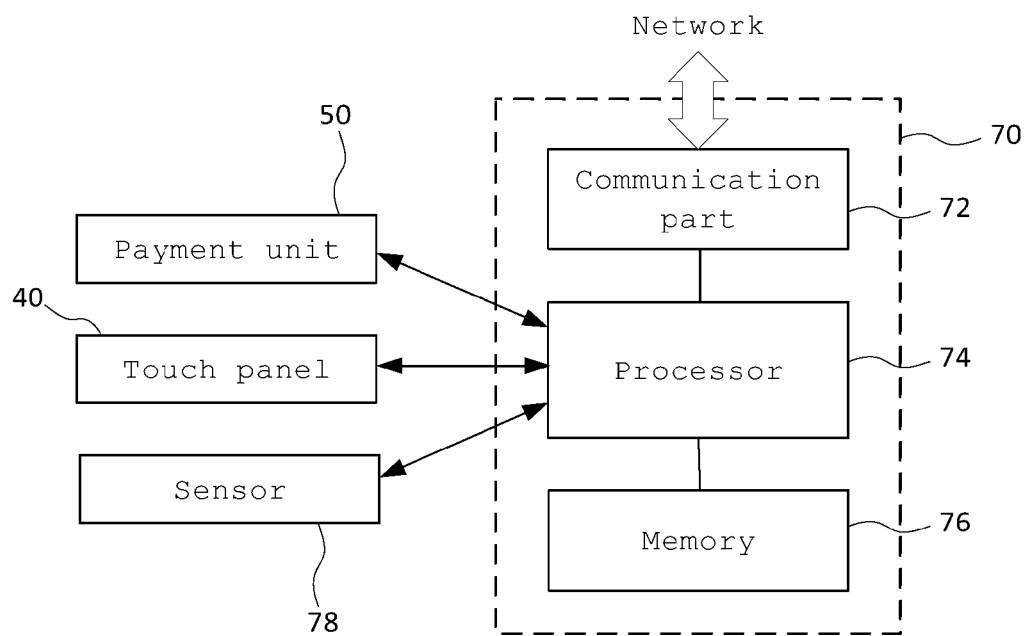
FIG. 24 is a block diagram showing electronic parts adopted in a coffee vending machine according to yet another embodiment of the present invention.
Figure 25:
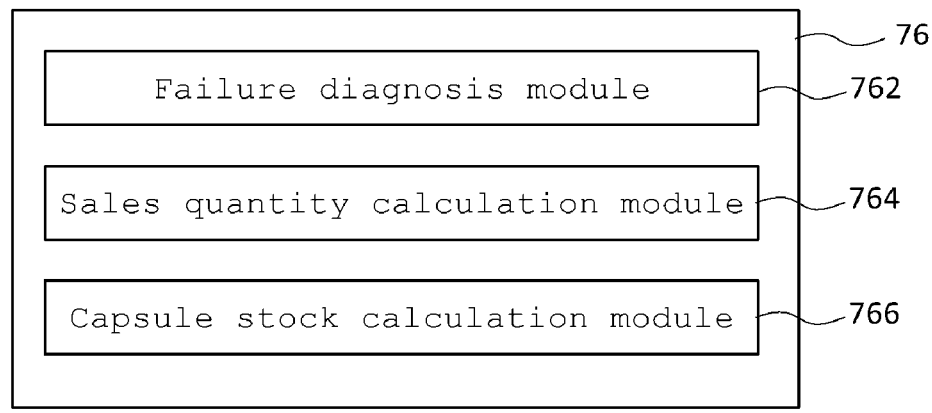
FIG. 25 is a schematic block diagram showing a software module adopted in the electronic parts of FIG. 24.
Figure 26:
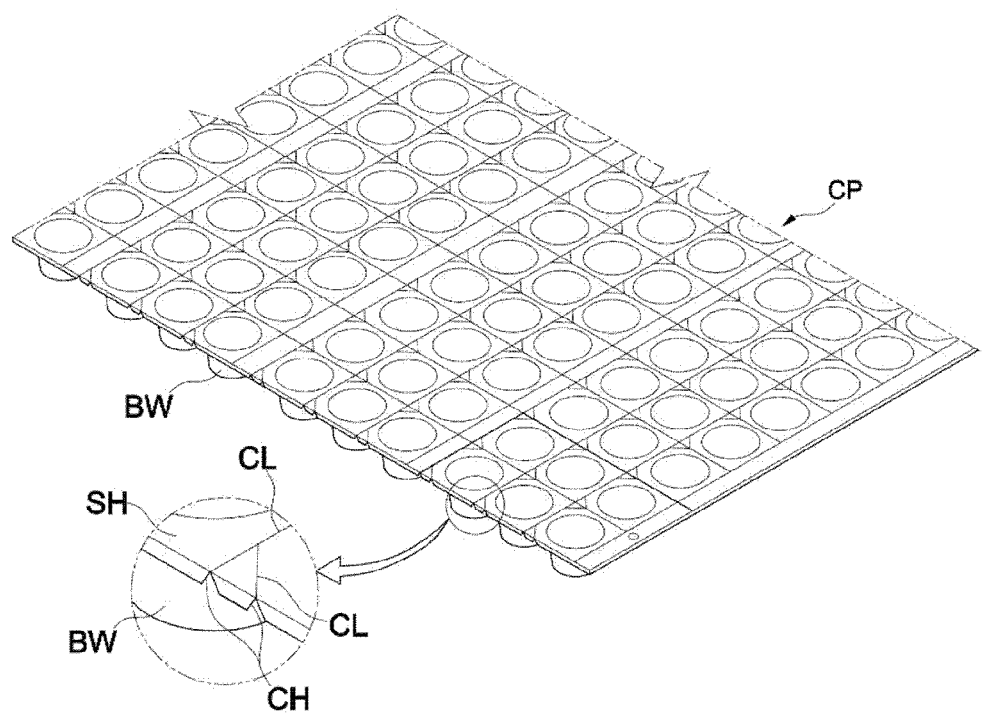
FIG. 26 is a perspective view showing arrangements of capsules in a conventional practice.

FIG. 24 is a block diagram showing electronic parts adopted in a coffee vending machine according to yet another embodiment of the present invention. FIG. 25 is a schematic block diagram showing a software module adopted in the electronic parts of FIG. 24.

Referring to FIG. 24, the coffee vending machine according to the present invention includes the touch panel 40, the payment unit 50, a sensor 78, and the control device 70. The touch panel 40, the payment unit 50, and the sensor are connected to the control device 70 to transmit, receive, or transmit and receive signals and data.

The payment unit 50 includes the mobile payment unit and the card payment unit, and without being limited thereto, it may include the bill payment unit, the coin payment unit, or a combination of the two or replace the mobile payment unit and the card payment unit with them.

The sensor 78 includes a first sensor disposed on the capsule stacking parts or the capsule feeding part to check the stock of the capsules, a second sensor disposed on the cup discharging part to monitor sales quantities, and a third sensor for monitoring operating states of the capsule transport part, the coffee brewing part, and the ice making part. The third sensor can be used to monitor an ice preparation state of the ice making part. In addition to the sensing data, further, the sensor 78 transmits, receives, or transmits and receives signal levels or signal waveforms in advance set to and from the control device 70. The sensor 78 includes an operation sensor, a camera, and so on.

The control device 70 includes a communication part 72, a processor 74, and a memory 76. According to the present invention, of course, the communication part 72 is integral with the processor 74, but without being limited thereto, the communication part 72 is a device separated from the processor 74 or the control device 70 in such a manner as to be connected to the processor 74 by means of a wire or cable.

The communication part 72 is connected to a manager terminal of the vending machine or a manager server of the vending machine through a network. The communication part 72 can support a communication protocol for a wired network or wireless network. The communication part 72 includes one or more wired and/or wireless communication sub systems for supporting one or more communication protocols. The wireless communication system includes a radio frequency (RF) receiver, an RF transmitter, an RF transceiver, optical (for example, infrared) receiver, an optical transmitter, and an optical transceiver, or a combination thereof.

The wired network includes public switched telephone network (PSTN), asymmetric digital subscriber line (ADSL), very high-data rate digital subscriber line (VDSL), PSTN emulation service (PES), and so on.

The wireless network includes a global system for mobile communication (GSM), enhanced data GSM environment (EDGE), code division multiple access (CDMA), w-code division multiple access (W-CDMA), long term evolution (LTE), LET-advanced (LET-A), orthogonal frequency division multiple access (OFDMA), WiMax, wireless fidelity (Wi-Fi), Bluetooth, and so on.

The processor 74 includes at least one or more central processing units (CPUs) or cores. Each central processing unit (CPU) is formed of a system on chip where a micro control unit (MCU) and a peripheral device (an integrated circuit for external expansion device) are located together, but it is not limited thereto. Further, the central processing unit (CPU) includes a register for storing commands to be processed, an arithmetic logical unit (ALU) for performing comparison, determination, and operation, a control unit for internally controlling the CPU to perform analysis and execution of the commands, and internal buses for connecting the register, the ALU, and the control unit.

Further, the processor 74 includes one or more data processors, image processors, or codecs, but it is not limited thereto. The processor 74 includes a peripheral device interface and a memory interface. The peripheral device interface connects the processor 74 with an input/output system and different peripheral devices, and the memory interface connects the processor 74 with the memory 76.

The processor 74 executes a software module or program to allow the vending machine to perform predetermined operations. The processor 74 executes a specific software module (command sets) stored in the memory 76 to perform specific functions corresponding to respective modules.

As shown in FIG. 25, the memory 76 includes a failure diagnosis module 762, a sales quantity calculation module 764, and a capsule stock calculation module 766.

The failure diagnosis module 762 serves to compare data in advance stored with the data sensed by the parts of the vending machine, while being executed by the processor 74, to discriminate whether the parts are normally operated or do not work. According to the present invention, otherwise, the failure diagnosis module 762 serves to sense the signals or output waveforms generated from the electric parts of the parts of the vending machine, to compare the sensed results with reference signals, and to determine whether they work or not.

The sales quantity calculation module 764 serves to count the quantities of coffee selected and paid from the coffee menu, count the number of cups discharged from the cup discharging part, or count the number of cups fed from the cup feeding part, while being executed by the processor 74.

The capsule stock calculation module 766 serves to calculate the stock of the capsules through a sensor for counting the number of cups transported to the capsule transport part through the capsule feeding part from the capsule stock initially set. According to the present invention, otherwise, the capsule stock calculation module 766 serves to calculate the capsule stock on the basis of a stacking height sensed by a sensor disposed on the capsule stacking parts.

Further, the memory 76 can store software, program, instruction set, or a combination of them so as to perform the operation of the vending machine, communication with the outside, and data transmission and reception, and further, the memory 76 can store an operating system, schedule operating policy, and so on.

Components of the software include an operating system module, a graphic module, a user interface module, a moving picture experts group (MPEG) module, a communication module, a camera module, an application module, and so on. The modules are expressed with instruction sets or programs The operating system includes an embedded operating system such as MS WINDOWS, LINUX, Darwin, RTXC, UNIX, OS X, Ios, macOS, VxWorks, Google OS, android, Bada (Samsung OS), Plan 9, and so on. The operating system can have a function of performing communication between various hardware (devices) and software components (modules).

The memory 76 includes dynamic random access memory (DRAM), non-volatile RAM (NVRAM), hard disk drive (HDD), or a combination of them. Further, the memory 76 includes at least one selected from an optical disk drive, a flash memory, and so on.

As described above, the coffee vending machine according to the present invention can efficiently and rapidly vend coffee having flavor and taste selected according to the consumer's preference by means of the capsule in which a liquid, viscous, or powder coffee material is stored, just at a place where the vending machine is built.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A coffee vending machine comprising:
a plurality of capsule stacking parts arranged in a lattice form to stack a plurality of capsules therein in a first direction;
a capsule feeding unit disposed at the centers of the bottoms of the capsule stacking parts to feed the capsules quantitatively;
a coffee brewing part for seating the capsule fed from the capsule feeding unit, feeding water to the capsule, and brewing coffee to be provided for a consumer; and
a cup discharging part for discharging a cup in which the coffee is contained to the outside,
wherein the coffee brewing part comprises a first portion seating part and a second portion seating part, the first portion seating part having a first semicircular concave portion formed on the side surface facing the second portion seating part in such a manner as to be extended toward the upper side thereof and the second portion seating part having a second semicircular concave portion formed on the side surface facing the first portion seating part in such a manner as to be extended toward the upper side thereof, so that if the first portion seating part and the second portion seating part are adjacent thereto or contacted with each other, the first concave portion and the second concave portion form a seating groove, and the capsule selectively fallen and transported from the capsule feeding unit is seated onto the seating groove and then freely falls through a space between the first portion seating part and the second portion seating part when the first portion seating part and the second portion seating part are spaced apart from each other.

2. The coffee vending machine according to claim 1, further comprising a capsule feeding part located under the capsule feeding unit and having a first transporter adapted to transport the capsule discharged from the capsule stacking parts to the first direction and a second transporter adapted to transport the capsule supplied from the first transporter in a second direction perpendicular to the first direction, the first transporter comprising: a first frame having a shape of a rectangle, a first driver disposed in a longitudinal direction of the first frame, at least one or more rows of first transport lanes formed on one side of the first driver to easily transport the capsule, and a first capsule transport member disposed in a perpendicular direction to the first transport lanes and having one end coupled to the first driver in such a manner as to push the capsules located at the respective first transport lanes toward one side.

3. The coffee vending machine according to claim 2, wherein the second transporter comprises a second frame disposed in a perpendicular direction to the first driver of the first transporter, driving and driven pulleys located symmetrically on both ends of the second frame, a tracked pulley type of connection member coupled to the driving and driven pulleys, and a second capsule transport member coupled to one side of the connection member.

4. The coffee vending machine according to claim 3, wherein the coffee brewing part comprises:
a support frame;
a capsule supporter disposed above the support frame; and
a third transporter disposed on one side surface of the support frame in such a manner as to be connected to the capsule supporter to allow the capsule supporter to be reciprocated by a given distance above the support frame.

5. The coffee vending machine according to claim 4, wherein the coffee brewing part further comprises a fourth transporter disposed on one side surface of the support frame in such a manner as to be connected to a cup holder for holding the cup fed from a cup feeding part located above the support frame to allow the cup holder to be reciprocated by a given distance.

6. The coffee vending machine according to claim 5, wherein the capsule transported by the third transporter and seated onto the capsule supporter and the cup transported by the fourth transporter are aligned on a lower portion of the coffee brewing part having a pressurizing structure.

7. The coffee vending machine according to claim 6, wherein while the fourth transporter is moved from a position in which the cup is fed from the cup feeding part to a position under the pressurizing structure, under control of a control device, the fourth transporter stops for a predetermined time period at an intermediate position corresponding to an ice feeding part.

8. The coffee vending machine according to claim 7, further comprising:
- a body for supporting the capsule stacking parts, the capsule feeding part disposed under the capsule stacking parts to transport the capsule, the coffee brewing part, and the cup discharging part;
- a touch panel or display panel located on a front surface of the body;
- a payment unit located on a front surface of the body; and
- the control device located inside the body to control operations of the capsule feeding unit, the capsule feeding part, the coffee brewing part, the cup discharging part, the touch panel, and the payment unit.

9. The coffee vending machine according to claim 8, wherein the control device comprises a failure diagnosis module, a sales quantity calculation module, and a capsule stock calculation module.

10. The coffee vending machine according to claim 4, wherein the support frame comprises a base plate, a first frame and a second frame having shapes of facing walls disposed on the base plate, and a top plate disposed on tops of the first frame and the second frame in such a manner as to slide along the first frame or the second frame to support the capsule supporter.

11. The coffee vending machine according to claim 10, further comprising a capsule container discharger disposed on the bottom of the base plate in such a manner as to be connected to an opening formed on the center of the base plate to discharge a capsule container falling from the capsule supporter.

12. The coffee vending machine according to claim 1, wherein each capsule feeding unit comprises first to third plates and sensing means, the first plate being located on the bottoms of the capsule stacking parts and having a discharge hole formed on the edge periphery easily rotated by a given angle by means of a driving device so as to discharge the capsule and a driving shaft located in the first direction passing through the center of the first plate in such a manner as to allow an output shaft of the driving device to be directly connected to the upper end thereof, the driving device being formed of one selected from a direct current motor and a stepping motor to control rotation to the given angle,
- the second plate being spaced apart from the first plate by a given distance above the first plate in such a manner as to be eccentrically coupled to the driving shaft and being rotated into a cutoff hole formed on the lower ends of the capsule stacking parts to prevent another capsule located above the capsule discharged from being discharged continuously,
- the third plate being located above the second plate in such a manner as to be close to the driving shaft of the driving device and having a plurality of radial protrusions adapted to adjust rotational angles of the first plate and the second plate, and
- the sensing means facing the side periphery of the third plate in such a manner as to sense the protrusions to generate a signal for controlling an operation of the driving device.

* * * * *